(12) United States Patent
Danilovic et al.

(10) Patent No.: US 11,888,328 B2
(45) Date of Patent: Jan. 30, 2024

(54) ACTIVE RECTIFICATION IN WIRELESS POWER SYSTEMS

(71) Applicant: WiTricity Corporation, Watertown, MA (US)

(72) Inventors: Milisav Danilovic, Watertown, MA (US); Conor Rochford, Newton, MA (US)

(73) Assignee: WITRICITY CORPORATION, Watertown, MA (US)

( * ) Notice: Subject to any disclaimer, the term of this patent is extended or adjusted under 35 U.S.C. 154(b) by 0 days.

(21) Appl. No.: 17/991,661

(22) Filed: Nov. 21, 2022

(65) Prior Publication Data

US 2023/0079848 A1 Mar. 16, 2023

Related U.S. Application Data

(63) Continuation of application No. 17/194,089, filed on Mar. 5, 2021, now abandoned.
(Continued)

(51) Int. Cl.
*H02J 50/12* (2016.01)
*H02M 1/34* (2007.01)
*H02M 7/217* (2006.01)

(52) U.S. Cl.
CPC .............. *H02J 50/12* (2016.02); *H02M 1/34* (2013.01); *H02M 7/217* (2013.01)

(58) Field of Classification Search
CPC ............. H02J 50/00; H02J 50/12; H02J 50/80
See application file for complete search history.

(56) References Cited

U.S. PATENT DOCUMENTS 5,640,082 A 6/1997 Lusher et al.
5,784,269 A 7/1998 Jacobs et al.
(Continued)

FOREIGN PATENT DOCUMENTS

CN 103414255 A 11/2013
CN 110103742 A 8/2019
(Continued)

OTHER PUBLICATIONS

International Search Report—International Application No. PCT/US2017/048481, dated Dec. 6, 2017, together with the Written Opinion of the International Searching Authority, 11 pages.
(Continued)

*Primary Examiner* — Rexford N Barnie
*Assistant Examiner* — Joseph N Inge
(74) *Attorney, Agent, or Firm* — Goodwin Procter LLP

(57) ABSTRACT

Disclosed herein are methods and systems for controlling an active rectifier of a wireless power receiver. The exemplary methods can include determining a reference value of a current into the rectifier, the reference value being based on a load requirement; determining a required value change in a present input current into the rectifier based on the reference value; transmitting, to a wireless power transmitter, a signal representative of the required value change in the present input current; determining a new value of the present input current after transmitting the signal; and, when the new value is within a predetermined range of the required value change, driving at least one transistor in the rectifier with a PWM signal based on the new value.

26 Claims, 21 Drawing Sheets

Related U.S. Application Data

(60) Provisional application No. 62/986,212, filed on Mar. 6, 2020.

(56) References Cited

U.S. PATENT DOCUMENTS

| | | | |
|---|---|---|---|
| 6,037,745 A | 3/2000 | Koike et al. | |
| 6,483,730 B2 | 11/2002 | Johnson, Jr. | |
| 7,276,886 B2 | 10/2007 | Kinder et al. | |
| 7,333,349 B2 | 2/2008 | Chang et al. | |
| 7,440,300 B2 | 10/2008 | Konishi et al. | |
| 7,535,133 B2 | 5/2009 | Perreault et al. | |
| 8,830,710 B2 | 9/2014 | Perreault et al. | |
| 9,461,714 B2 | 10/2016 | Cook et al. | |
| 9,782,092 B2 | 10/2017 | Zhang | |
| 9,853,564 B2 | 12/2017 | Kang et al. | |
| 10,027,186 B2 | 7/2018 | Aikawa et al. | |
| 10,076,966 B2 | 9/2018 | Koizumi et al. | |
| 10,090,885 B2 | 10/2018 | Widmer et al. | |
| 10,141,788 B2 | 11/2018 | Karnstedt et al. | |
| 10,218,224 B2 | 2/2019 | Campanella et al. | |
| 10,343,535 B2 | 7/2019 | Cook et al. | |
| 10,418,841 B2 | 9/2019 | Danilovic et al. | |
| 10,461,587 B2 | 10/2019 | Sieber | |
| 10,651,688 B2 | 5/2020 | Karnstedt et al. | |
| 10,673,282 B2 | 6/2020 | Campanella et al. | |
| 11,017,942 B2 | 5/2021 | Rochford et al. | |
| 2003/0169027 A1 | 9/2003 | Croce et al. | |
| 2007/0064457 A1 | 3/2007 | Perreault et al. | |
| 2007/0222542 A1 | 9/2007 | Joannopoulos et al. | |
| 2008/0265995 A1 | 10/2008 | Okamoto et al. | |
| 2008/0278264 A1 | 11/2008 | Karalis et al. | |
| 2009/0039929 A1* | 2/2009 | Kossel | H03L 7/089 713/500 |
| 2009/0284322 A1* | 11/2009 | Harrison | H03K 7/08 332/109 |
| 2010/0141042 A1 | 6/2010 | Kesler et al. | |
| 2010/0237709 A1 | 9/2010 | Hall et al. | |
| 2010/0277006 A1 | 11/2010 | Urciuoli | |
| 2010/0295506 A1 | 11/2010 | Ichikawa | |
| 2011/0074346 A1 | 3/2011 | Hall et al. | |
| 2011/0116290 A1 | 5/2011 | Boys | |
| 2011/0193416 A1 | 8/2011 | Campanella et al. | |
| 2011/0196544 A1 | 8/2011 | Baarman et al. | |
| 2011/0260865 A1 | 10/2011 | Bergman et al. | |
| 2012/0112535 A1 | 5/2012 | Karalis et al. | |
| 2013/0062966 A1 | 3/2013 | Verghese et al. | |
| 2013/0069441 A1 | 3/2013 | Verghese et al. | |
| 2014/0035704 A1 | 2/2014 | Efe et al. | |
| 2014/0049118 A1 | 2/2014 | Karalis et al. | |
| 2014/0091634 A1 | 4/2014 | Mayo et al. | |
| 2014/0152117 A1 | 6/2014 | Sankar | |
| 2014/0292092 A1 | 10/2014 | Ichinose et al. | |
| 2014/0361636 A1 | 12/2014 | Endo et al. | |
| 2014/0368052 A1 | 12/2014 | Norconk et al. | |
| 2015/0035372 A1 | 2/2015 | Aioanei | |
| 2015/0051750 A1 | 2/2015 | Kurs et al. | |
| 2015/0055262 A1 | 2/2015 | Lin | |
| 2015/0244179 A1 | 8/2015 | Ritter et al. | |
| 2015/0303703 A1 | 10/2015 | Hayashi et al. | |
| 2015/0319838 A1 | 11/2015 | Bhutta | |
| 2015/0357826 A1 | 12/2015 | Yoo et al. | |
| 2015/0372516 A1 | 12/2015 | Na et al. | |
| 2016/0079766 A1 | 3/2016 | Jeong et al. | |
| 2016/0084894 A1 | 3/2016 | Govindaraj et al. | |
| 2016/0218566 A1 | 7/2016 | Bunsen et al. | |
| 2016/0248275 A1 | 8/2016 | Okidan | |
| 2016/0254679 A1 | 9/2016 | Liu et al. | |
| 2016/0294221 A1 | 10/2016 | Maniktala | |
| 2016/0308393 A1 | 10/2016 | Kumar et al. | |
| 2016/0380555 A1 | 12/2016 | Kang et al. | |
| 2017/0093168 A1 | 3/2017 | Von Novak, III et al. | |
| 2017/0104365 A1 | 4/2017 | Ghosh et al. | |
| 2017/0117751 A1 | 4/2017 | Karnstedt et al. | |
| 2017/0126069 A1 | 5/2017 | Martin | |
| 2017/0256991 A1 | 9/2017 | Bronson et al. | |
| 2017/0324351 A1 | 11/2017 | Rochford | |
| 2017/0358953 A1* | 12/2017 | Trudeau | H02J 50/12 |
| 2018/0006566 A1 | 1/2018 | Bronson et al. | |
| 2018/0040416 A1 | 2/2018 | Lestoquoy | |
| 2018/0090995 A1 | 3/2018 | Arasaki et al. | |
| 2019/0006888 A1 | 1/2019 | Hajimiri et al. | |
| 2019/0103767 A1 | 4/2019 | Lethellier | |
| 2019/0148986 A1* | 5/2019 | Yoo | H02J 50/12 307/104 |
| 2019/0165611 A1 | 5/2019 | Miyazawa et al. | |
| 2019/0326743 A1 | 10/2019 | Govindaraj | |
| 2019/0341796 A1 | 11/2019 | Gu et al. | |
| 2020/0195164 A1 | 6/2020 | Zhan et al. | |
| 2020/0303926 A1 | 9/2020 | Yang | |
| 2020/0359468 A1 | 11/2020 | Jung et al. | |
| 2020/0381945 A1 | 12/2020 | Wang et al. | |
| 2021/0088567 A1 | 3/2021 | Guedon et al. | |
| 2021/0249889 A1* | 8/2021 | Mao | H03L 7/099 |
| 2021/0281099 A1 | 9/2021 | Wan | |
| 2021/0281112 A1 | 9/2021 | Danilovic et al. | |

FOREIGN PATENT DOCUMENTS

| | | |
|---|---|---|
| DE | 10 2014 208 991 A1 | 11/2014 |
| EP | 0609964 A2 | 8/1994 |
| EP | 2763279 A1 | 8/2014 |
| EP | 2947749 A1 | 11/2015 |
| EP | 3145047 A1 | 3/2017 |
| EP | 3203634 A1 | 8/2017 |
| EP | 3248270 A1 | 11/2017 |
| EP | 3407467 A1 | 11/2018 |
| GB | 1506633 A | 4/1978 |
| JP | H11127580 A | 5/1999 |
| JP | 5635215 B1 | 12/2014 |
| JP | 2015208150 A | 11/2015 |
| JP | 2015231306 A | 12/2015 |
| JP | 2016131447 A | 7/2016 |
| JP | 2018102054 A | 6/2018 |
| KR | 20170118573 A | 10/2017 |
| WO | WO-2001018936 A1 | 3/2001 |
| WO | WO-2013036947 A2 | 3/2013 |
| WO | WO-2015119511 A1 | 8/2015 |
| WO | WO-2016099806 A1 | 6/2016 |
| WO | WO-2017070009 A1 | 4/2017 |
| WO | WO-2018136885 A1 | 7/2018 |

OTHER PUBLICATIONS

International Search Report—International Application No. PCT/US2021/021209, dated Aug. 17, 2021, together with the Written Opinion of the International Searching Authority, 17 pages.

International Search Report and Written Opinion for PCT/US2020/048046 dated Oct. 8, 2020, 10 pages.

Notification of Transmittal of the International Search Report and the Written Opinion of the International Searching Authority, or the Declaration, PCT/US2017/033997, 9 pages, dated Sep. 12, 2017.

Rivas, et al., Design Considerations for Very High Frequency dc-dc Converters, 37th IEEE Power Electronics Specialists Conference, Jun. 18-22, 2006, 11 pages, Jeju, Korea.

Rivas, et al., New Architectures for Radio-Frequency dc/dc Power Conversion, 2004 35th Annual IEEE Power Electronics Specialists Conference, 2004, 11 pages, Aachen, Germany.

International Search Report and Written Opinion for PCT/US2019/063616 dated Mar. 11, 2020, 9 pages.

International Search Report and Written Opinion for PCT/US2019/059441 dated Feb. 18, 2020, 11 pages.

International Search Report and Written Opinion for PCT/US2020/034344 dated Oct. 28, 2020, 15 pages.

International Search Report—International Application No. PCT/US2017/054055 dated Dec. 21, 2017, together with the Written Opinion of the International Searching Authority, 12 pages.

U.S. Appl. No. 16/882,117 U.S. Pat. No. 11,489,332 Published as: US2020/0373768 A1, Protection Circuits for Wireless Power Receivers, filed May 22, 2020.

(56) References Cited

OTHER PUBLICATIONS

U.S. Appl. No. 16/882,136 Published as: US2020/0373752 A1, Protection Circuits for Wireless Power Receivers, filed May 22, 2020.
U.S. Appl. No. 16/671,828 U.S. Pat. No. 11,017,942 Published as: US 2020-0143982 A1, Systems and Methods for Wireless Power Receivers, filed May 22, 2020.
U.S. Appl. No. 16/698,317 U.S. Pat. No. 11,159,055 Systems and Methods for Low Power Excitation in High Power Wireless Power Systems, filed Nov. 27, 2019.
U.S. Appl. No. 17/507,510 Published as: US 2022-0103017 A1 Systems and Methods for Low Power Excitation in High Power Wireless Power Systems, filed Oct. 21, 2021.
U.S. Appl. No. 17/556,309 Published as: US 2022-0115913 A1 Systems and Methods for Low Power Excitation in High Power Wireless Power Systems, filed Dec. 20, 2021.
U.S. Appl. No. 15/602,775 U.S. Pat. No. 10,804,742 Published as: US2017/0346343, A1 Voltage Regulation in Wireless Power Receivers, filed May 23, 2017.
U.S. Appl. No. 17/039,266 U.S. Pat. No. 11,349,342 Published as: US2021/0028652, Voltage Regulation in Wireless Power Receivers, filed Sep. 30, 2020.
U.S. Appl. No. 15/685,889 U.S. Pat. No. 10,418,841 Published as: US2018/0062421, Wireless Power Systems Having Interleaved Rectifiers, filed Aug. 24, 2017.
U.S. Appl. No. 16/543,090 U.S. Pat. No. 10,707,693 Published as: US2020/0044477, Wireless Power Systems Having Interleaved Rectifiers, filed Aug. 16, 2019.
U.S. Appl. No. 17/003,800 U.S. Pat. No. 11,316,375 Published as: US2021/0066968, Control of Active Rectification in Wireless Power Systems, filed Aug. 26, 2020.
U.S. Appl. No. 17/700,243 Published as: US 2022-0285994 A1, Bidirectional Operation of Wireless Power Systems, filed Mar. 21, 2022.
U.S. Appl. No. 17/161,479 Published as: US 2021-0234365 A1 Systems and Methods for Auxiliary Power Dropout Protection, filed Jan. 28, 2021.
U.S. Appl. No. 17/161,487 Published as: US 2021-0234366 A1, Gate Driver Implementations for Safe Wireless Power System Operation, filed Jan. 28, 2021.
U.S. Appl. No. 17/155,855 U.S. Pat. No. 11,356,079 Published as: US 2021-0234534 A1 Tunable Reactance Circuits for Wireless Power Systems, filed Jan. 22, 2021.
U.S. Appl. No. 17/194,089 Published as: US 2021-0281112 A1, Active Rectification in Wireless Power Systems, filed Mar. 5, 2021.
U.S. Appl. No. 17/194,082 Published as: US 2021-0297004 A1 Active Rectification in Wireless Power Systems, filed Mar. 5, 2021.
U.S. Appl. No. 17/853,061, Systems and Methods for Pairing Wireless Power Transmitters and Receivers, filed Jun. 29, 2022.
U.S. Appl. No. 17/943,990, Systems and Methods for Pairing Wireless Power Receivers and Transmitters, filed Sep. 13, 2022.

* cited by examiner

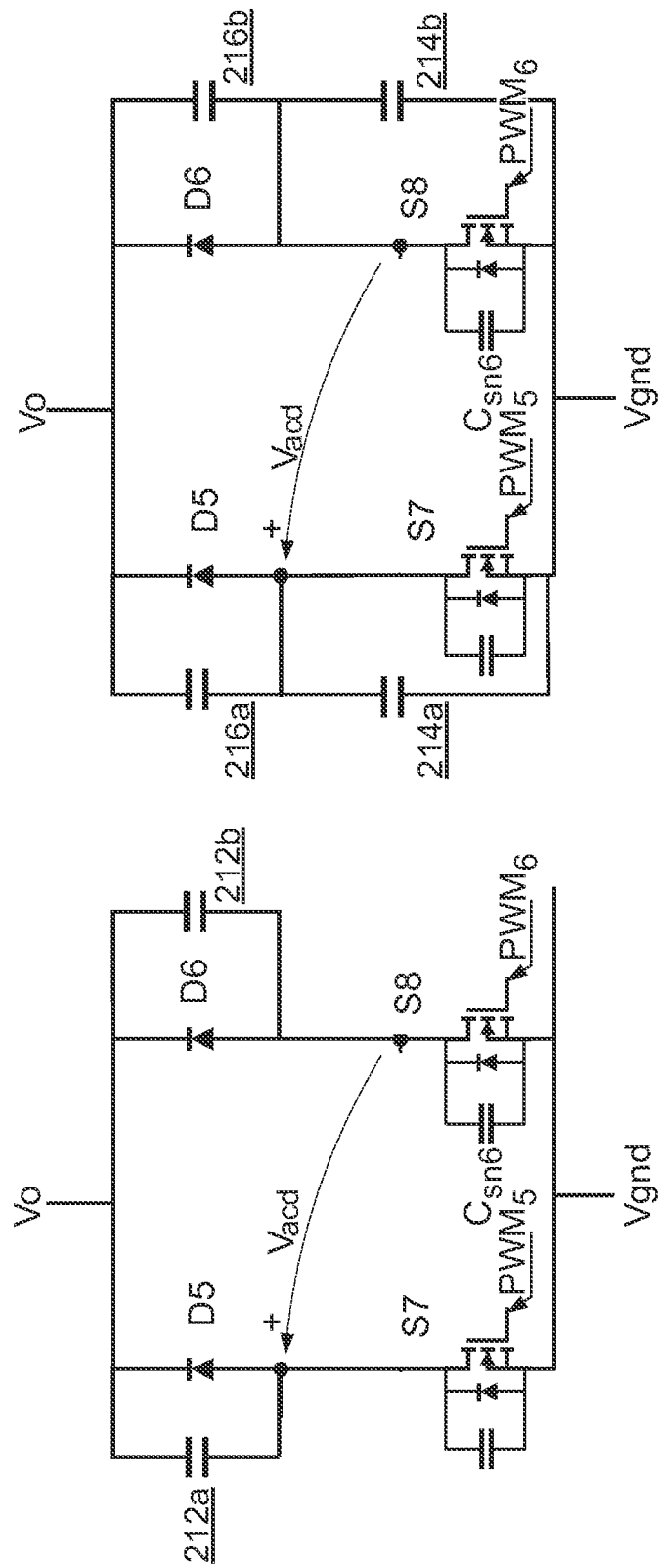

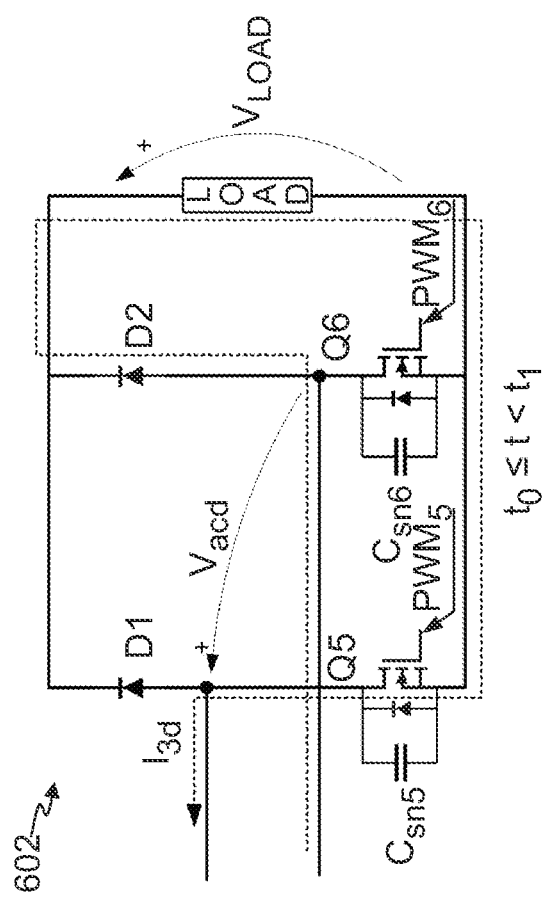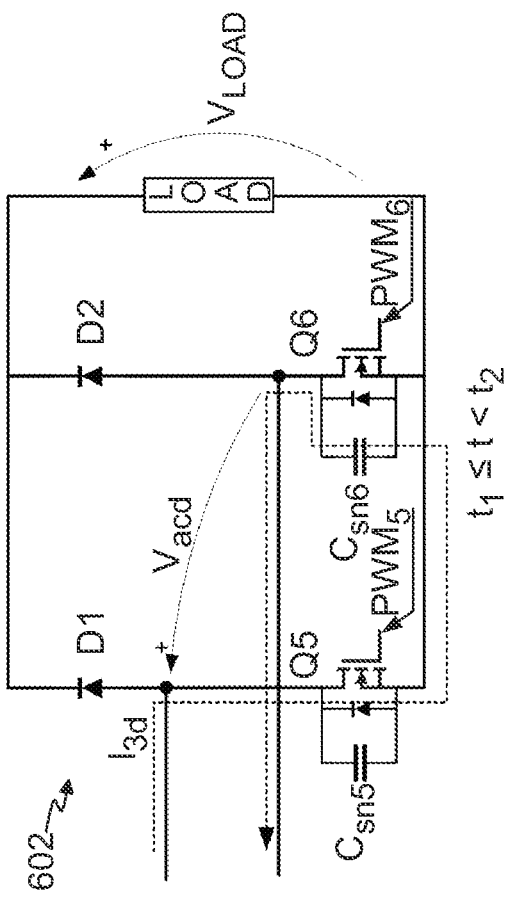
FIG. 9A
FIG. 9B

ACTIVE RECTIFICATION IN WIRELESS POWER SYSTEMS

CROSS-REFERENCE TO RELATED APPLICATION

This application is a continuation of U.S. patent application Ser. No. 17/194,089 filed on Mar. 5, 2021, which claims priority to and the benefit of U.S. Provisional Application No. 62/986,212 titled "ACTIVE RECTIFICATION IN WIRELESS POWER SYSTEMS" and filed on Mar. 6, 2020, the entireties of which are incorporated herein by reference.

TECHNICAL FIELD

The following disclosure is directed to methods and systems for active rectification in wireless power systems and, more specifically, methods and systems for charging and/or heating a high-voltage battery using a wireless power receiver having an active rectifier.

BACKGROUND

Wireless power systems are configured to transmit power to a load (e.g., a battery of an electrical device) without physical contact between the transmitter and receiver. Wireless power receivers of such systems generally include a rectifier to convert oscillating energy to DC for delivery to a load (e.g., a battery) coupled to the receiver. It can be beneficial for the rectifier to operate with high efficiency.

SUMMARY

In one aspect, the disclosure features a method for controlling an active rectifier of a wireless power receiver. The method can include determining a reference value of a current into the rectifier, the reference value being based on a load requirement; determining a required value change in a present input current into the rectifier based on the reference value; transmitting, to a wireless power transmitter, a signal representative of the required value change in the present input current; determining a new value of the present input current after transmitting the signal; and, when the new value is within a predetermined range of the required value change, driving at least one transistor in the rectifier with a PWM signal based on the new value.

Various embodiments of the method may include one or more of the following features.

The method can include receiving, from a battery management system, a request for at least one of: a voltage, a current, or a power from the wireless power receiver. The method can include, when the new value is not within the predetermined range, determining another reference value of the current into the rectifier.

The transmitting, to the wireless power transmitter, the signal representative of the required value change in the present input current can causes a change in power transmitted by the wireless power transmitter to the wireless power receiver. The new value of the present input current can be based on the change in transmitted power. The change in transmitted power can be to decrease the power. The change in transmitted power can be to decrease the power to zero. The change in transmitted power can be to increase the power. The method can include comparing the new value of the present input current to the predetermined range of the required value change. The method can be executed by a controller coupled to the active rectifier.

In another aspect, the disclosure features a controller for controlling an active rectifier of a wireless power receiver, in which the controller is coupled to the rectifier. The controller can be configured to perform the following steps: determining a reference value of a current into the rectifier, the reference value being based on a load requirement; determining a required value change in a present input current into the rectifier based on the reference value; transmitting, to a wireless power transmitter, a signal representative of the required value change in the present input current; determining a new value of the present input current after transmitting the signal; and, when the new value is within a predetermined range of the required value change, driving at least one transistor in the rectifier with a PWM signal based on the new value.

Various embodiments of the controller may include one or more of the following features.

The controller can be configured to receive, from a battery management system coupled to the output of the rectifier, a request for at least one of: a voltage, a current, or a power from the wireless power receiver. The controller can be configured, when the new value is not within the predetermined range, to determine another reference value of the current into the rectifier. The transmitting, to the wireless power transmitter, the signal representative of the required value change in the present input current can cause a change in power transmitted by the wireless power transmitter to the wireless power receiver. The new value of the present input current can be based on the change in transmitted power.

The change in transmitted power can be to decrease the power. The change in transmitted power can be to decrease the power to zero. The change in transmitted power can be to increase the power. The controller can be configured to compare the new value of the present input current to the predetermined range of the required value change. The controller can be coupled to the at least one transistor in the rectifier.

In another aspect, the disclosure features an active rectifier for a wireless power receiver. The active rectifier can include a first diode coupled between a first input of the rectifier and an output of the rectifier; a first transistor coupled between the first input and ground; a first capacitive snubber coupled in parallel to at least one of: (i) the first diode or (ii) the first transistor; a second diode coupled between a second input of the rectifier and the output; a second transistor coupled between the second input and ground; and a second capacitive snubber coupled in parallel to at least one of: (i) the second diode or (ii) the second transistor.

Various embodiments of the active rectifier may include one or more of the following features.

The first and second capacitive snubbers can be configured to reduce a reactive current in the wireless power receiver. The first and second capacitive snubbers can be configured to reduce a switching loss of the respective first and second transistors. Each of the first capacitive snubber and the second capacitive snubber can include a resistive component. Each of the first capacitive snubber and the second capacitive snubber can include a plurality of capacitors. The wireless power receiver can be configured to deliver power of approximately 11 kW to a load coupled to the output of the active rectifier, and wherein each capacitive snubber has a capacitance value between 1-30 nanoFarads.

The active rectifier can be configured to operate at a frequency of 85 kHz+/−10 kHz. The wireless power receiver can include a receiver resonator coil configured to couple via an electromagnetic field to a wireless power transmitter and, when the active rectifier is operating, an impedance presented by the active rectifier to the receiver resonator coil can be resistive. The active rectifier can be configured to provide current for charging a battery coupled to an output of the rectifier. The active rectifier can be configured to provide current to a resistor coupled to an output of the rectifier.

In another aspect, the disclosure features a wireless power receiver including a receiver resonator coil configured to couple via an electromagnetic field to a wireless power transmitter; and an active rectifier coupled to an output of the receiver resonator coil. The active rectifier can include a first diode coupled between a first input of the rectifier and an output of the rectifier; a first transistor coupled between the first input and ground; a first capacitive snubber coupled in parallel to at least one of: (i) the first diode or (ii) the first transistor; a second diode coupled between a second input of the rectifier and the output; a second transistor coupled between the second input and ground; and a second capacitive snubber coupled in parallel to at least one of: (i) the second diode or (ii) the second transistor.

Various embodiments of the wireless power receiver may include one or more of the following features.

The first and second capacitive snubbers are configured to reduce a reactive current in the wireless power receiver. The first and second capacitive snubbers can be configured to reduce a switching loss of the respective first and second transistors. Each of the first capacitive snubber and the second capacitive snubber can include a resistive component. Each of the first capacitive snubber and the second capacitive snubber can include a plurality of capacitors. The wireless power receiver can be configured to deliver power of approximately 11 kW to a load coupled to the output of the active rectifier, and each capacitive snubber can have a capacitance value between 1-30 nanoFarads.

The active rectifier can be configured to operate at a frequency of 85 kHz+/−10 kHz. When the active rectifier is operating, an impedance presented by the active rectifier to the receiver resonator coil can be resistive. The active rectifier can be configured to provide current for charging a battery coupled to an output of the rectifier. The active rectifier can be configured to provide current to a resistor coupled to an output of the rectifier.

In another aspect, the disclosure features a method for active rectification in a wireless power receiver. The method can include receiving a current signal from an input of an active rectifier of the receiver; detecting the zero-crossing of the current signal to produce a zero-crossing detection signal; detecting a phase of the zero-crossing detection signal to produce a sync signal; generating a ramp signal based on the sync signal; and generating a pulse-width modulation (PWM) signal for each transistor of the active rectifier.

Various embodiments of the method may include one or more of the following features. The method can further include providing the PWM signal to the active rectifier. the current signal comprises one or more harmonics.

BRIEF DESCRIPTION OF THE DRAWINGS

FIGS. 2C-2D are schematics of example active rectifiers having capacitive snubbers.

FIGS. 9A-9K are various states of the exemplary active rectifier of FIG. 2B or FIG. 6 as a function of time.

DETAILED DESCRIPTION

Disclosed herein are exemplary embodiments of wireless power systems including active rectifiers. In various embodiments, such wireless power systems can be configured to charge and/or heat batteries. In particular, the systems can be configured to charge and/or heat high-voltage batteries, e.g., of a vehicle, industrial equipment, machinery, a robot, etc.

Wireless Power Systems

Figure 1:
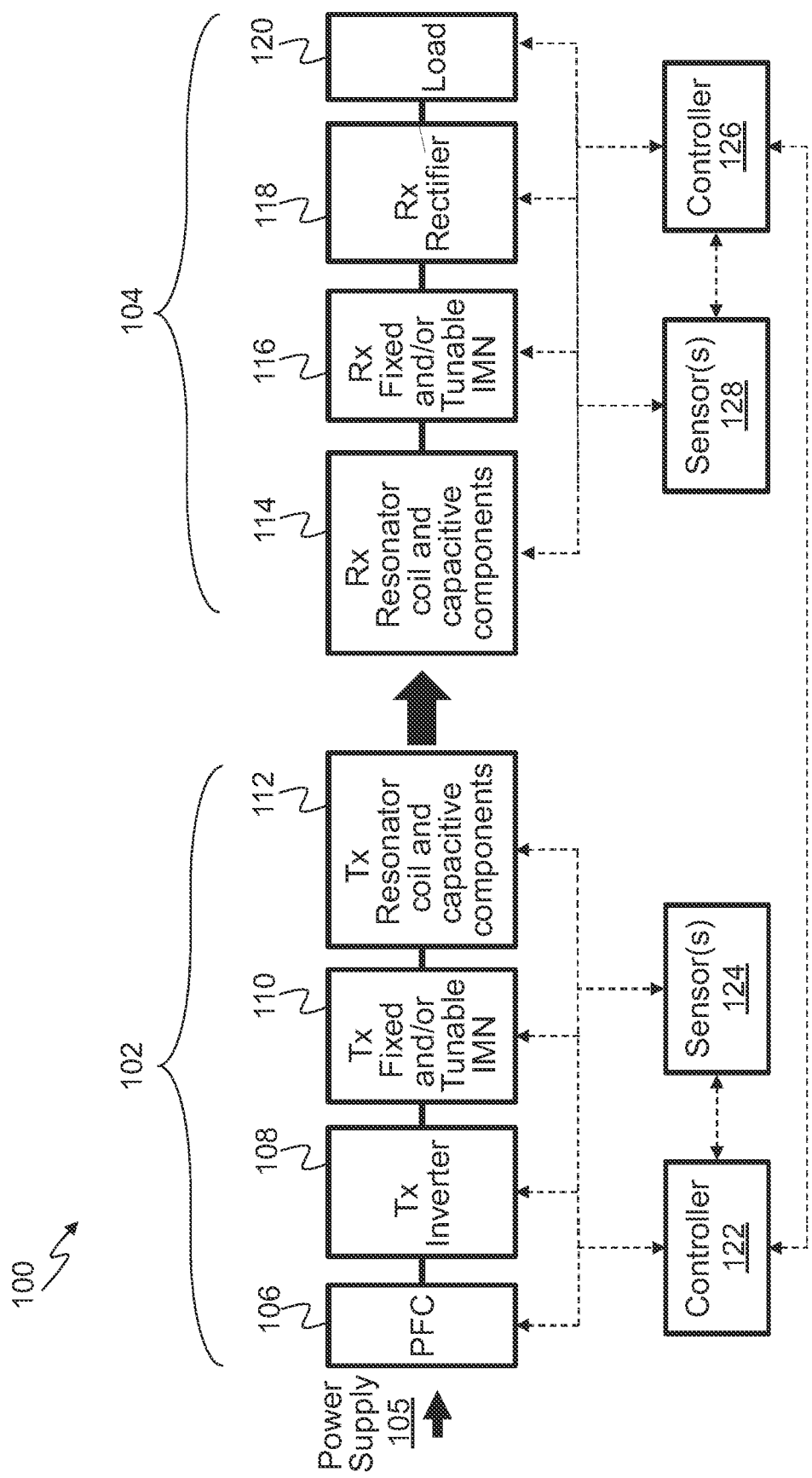
FIG. 1 is a block diagram of an exemplary wireless power system.

FIG. 1 is a block diagram of an exemplary wireless power system 100. The system 100 includes a wireless power transmitter 102 and a wireless power receiver 104. In transmitter 102, a power supply 105 (e.g., AC mains, battery, etc.) provides power to an inverter 108. Additional components can include power factor correction (PFC) circuit 106 before the inverter stage 108. The inverter 108 drives the transmitter resonator coil and capacitive components 112 ("resonator"), via an impedance matching network 110 (including fixed and/or tunable network components). The transmitter resonator produces an oscillating magnetic field which induces a current and/or voltage in receiver resonator. The received energy is provided to a rectifier 118 via impedance matching network 116 (including fixed and/or tunable network components). Ultimately, the rectified power is provided to a load 120 (e.g., one or more batteries of an electric or hybrid vehicle). In some embodiments, the battery voltage level can impact various parameters (e.g., impedance) of the wireless power system 100. Therefore, the battery voltage level may be received, determined, or measured to be provided as input to other portions of the wireless power system 100. For example, typical battery voltage ranges for electric vehicles include 0-280 V, 0-350 V, 0-420 V, etc.

In some embodiments, one or more components of the transmitter 102 can be coupled to a controller 122, which may include a communication module (e.g., Wi-Fi, radio, Bluetooth, in-band signaling mechanism, etc.) configured to communicate with a communication module of receiver 104. In some embodiments, one or more components of the transmitter 102 can be coupled to one or more sensors 124 (e.g., a current sensor, a voltage sensor, a power sensor, a temperature sensor, a fault sensor, etc.). The controller 122 and sensor(s) 124 can be operably coupled to control portions of the transmitter 102 based on feedback signals from the sensor(s) 124 and/or sensor(s) 128.

In some embodiments, one or more components of the receiver 104 can be coupled to a controller 126, which may include a communication module (e.g., Wi-Fi, radio, Bluetooth, in-band signaling mechanism, etc.) configured to communicate with the communication module of transmitter 102. In some embodiments, one or more components of the transmitter 104 can be coupled to one or more sensors 128 (e.g., a current sensor, a voltage sensor, a power sensor, a temperature sensor, a fault sensor, etc.). The controller 126 and sensor(s) 128 can be operably coupled to control portions of the transmitter 102 based on feedback signals from the sensor(s) 128 and/or sensor(s) 124.

Examples of wireless power systems can be found in U.S. Patent Application Publication No. 2010/0141042, published Jun. 10, 2010 and titled "Wireless energy transfer systems," and U.S. Patent Application Publication No. 2012/0112535, published May 10, 2012 and titled "Wireless energy transfer for vehicles," both of which are hereby incorporated by reference in their entireties.

High-power wireless power transmitters can be configured to transmit wireless power in applications such as powering of and/or charging a battery of vehicles, industrial machines, robots, or electronic devices relying on high power. For the purpose of illustration, the following disclosure focuses on wireless power transmission for vehicles. However, it is understood that any one or more of the embodiments described herein can be applied to other applications in which wireless power can be utilized. For instance, the exemplary methods and systems are extendable to consumer electronics (e.g., operating at low power), general isolated DC/DC converters, buses, trucks (e.g., operating at high power), etc. Therefore, parameters (e.g., frequency, power level, voltage level, snubber capacitor value, etc.) discussed herein are considered exemplary and may be configured according to the application.

As used herein, the term "capacitor", or the symbol therefor, can refer to one or more electrical components having a capacitance (e.g., in Farads) and/or capacitive reactance (e.g., in Ohms). For example, capacitor can include one or more capacitors (e.g., in a "bank" of capacitors) that may be on the order of tens, hundreds, etc. of discrete capacitors. Two or more capacitors may be coupled in series or parallel to attain the desired capacitance and/or desired capacitive reactance. Note that capacitive reactance may be expressed as a negative value herein. However, one skilled in the art would recognize that, in some conventions, capacitive reactance may also be expressed as a positive value. While the disclosure, including the Figures, may provide exemplary values for the various electrical components, it is understood that the value of the components can be customized for the particular application. For example, the value of various electronic components can depend whether the wireless power transmitter is used to transmit power for charging a vehicle battery (on the order of thousands of Watts) or a cell phone battery (typically less than 5 Watts).

Dual-Mode Operation

In some embodiments, the wireless power system 100 can be configured for one or more modes of operation. The modes of operation may include providing energy for one or more types of a load, e.g., charging a battery and/or heating a battery. In an exemplary "charging mode", the system 100 can be configured to provide a voltage to a battery. The charging mode may include a constant current (CC) mode and/or a constant voltage (CV) mode. In an exemplary "heating mode", the system 100 can be configured to provide a current to resistor(s) configured to heat the battery. The heating mode may include a constant voltage (CV) mode. As discussed herein, the battery and/or resistor may be referred to as the 'load'.

Figure 2A:
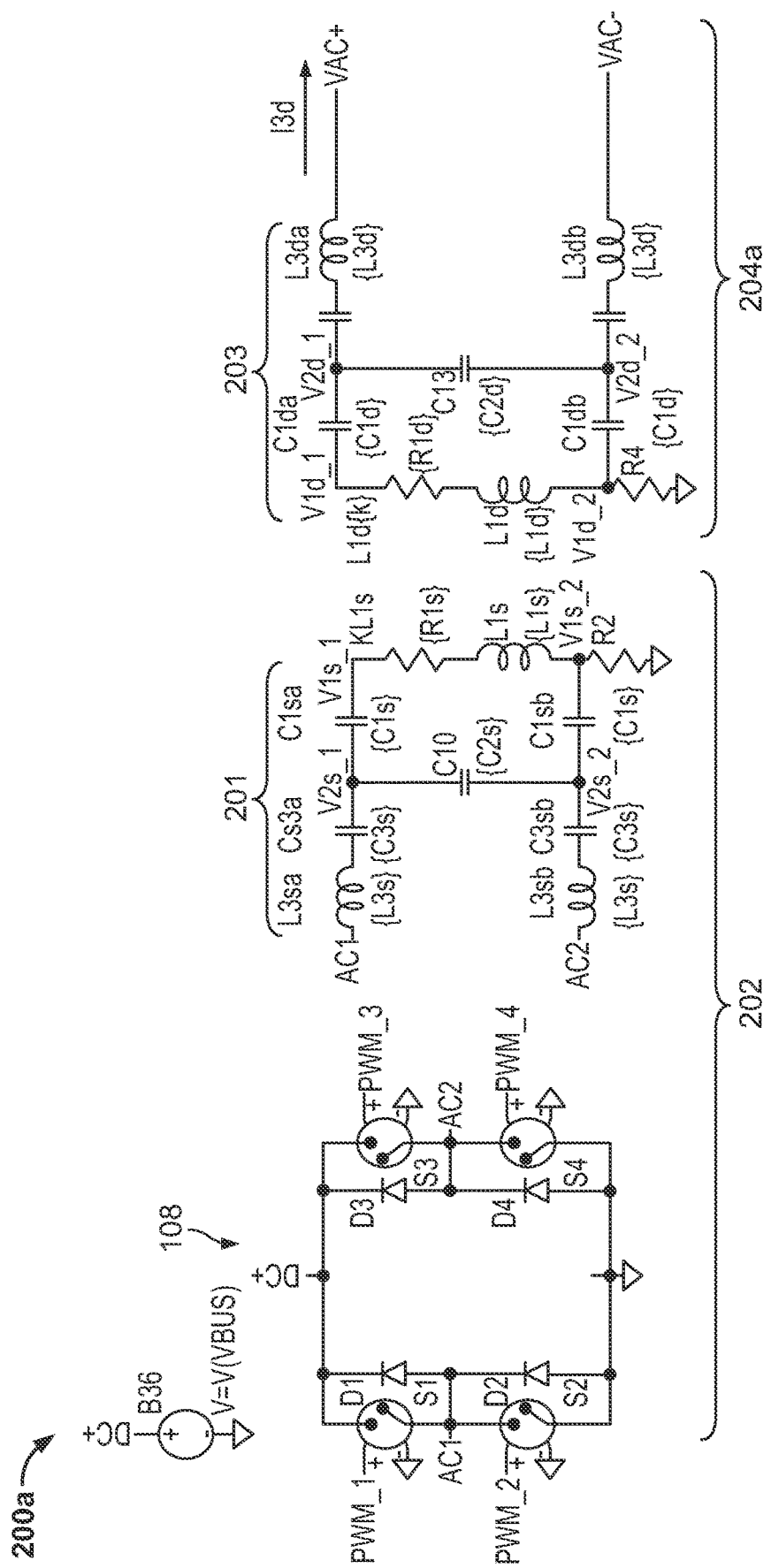
FIGS. 2A-2B is schematic of a wireless power system configured to operate in the charging and/or heating modes.
Figure 2B:
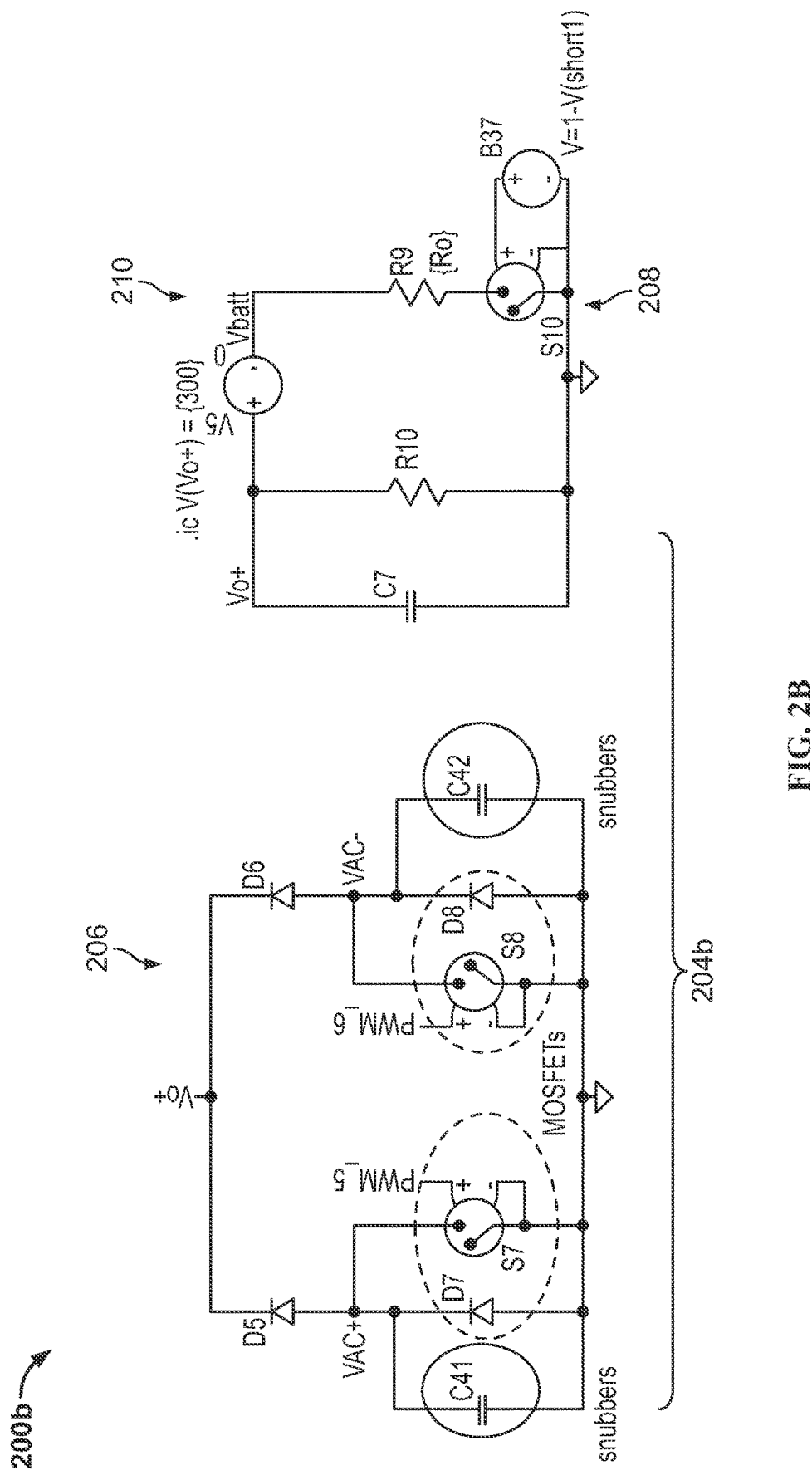

FIGS. 2A-2B illustrates a wireless power system 200 (including portions 200a, 200b) configured to operate in the charging and/or heating modes. The wireless power system 200 includes a wireless power transmitter 202 and wireless power receiver 204a, 204b (collectively referred to as 204). The wireless power system 200 can include similar or same components as wireless power system 100 described above.

In exemplary receiver portion 204, the active rectifier 206 may be a full-bridge rectifier including a diode D5 coupled in series to a transistor S7 (having a body diode D7) and a diode D6 coupled in series to a transistor S8 (having a body diode D8). The diodes D5, D6 may be silicon diodes. The transistors S7, S8 may be silicon MOSFETs. By using silicon diodes and silicon MOSFETs in the construction of the active rectifier 206, the costs of the receiver 204 and the system 200 overall can be minimized.

In some embodiments, transistors S7 and S8 are coupled in parallel to capacitive snubbers C41 and C42, respectively. In some embodiments, as illustrated in FIG. 2C, diodes D5 and D6 are each coupled in parallel to respective capacitive snubbers 212a, 212b. In some embodiments, as illustrated in FIG. 2D, transistors S7 and S8 are coupled in parallel to respective capacitive snubbers 214a, 214b and diodes D5 and D6 are coupled in parallel to respective capacitive snubbers 216a, 216b. Note that, in some embodiments, the position of transistor S7 is swapped with diode D5 and the position of transistor S8 is swapped with diode D6. Note that, in some embodiments, the rectifier may have only a single capacitive snubber (e.g., across one transistor and not the other). Each capacitive snubber may include one or more capacitive components (e.g., capacitors). In some embodiments, the snubber capacitance can depend on the wireless power system specifications and may be on the order of one nanoFarad to tens of nanoFarads. In some embodiments, the capacitive snubber has a resistive portion.

The capacitive snubber has one or more advantages and/or benefits when used in a wireless power system. By selecting the value of the capacitive snubbers correctly, the delivered power to the load 120 can be increased. For example, in a high power wireless power system configured to deliver 10-20 kW output, the capacitive snubbers can enable additional hundreds of Watts (e.g., 100 to 900 Watts) on top of the 10-20 kW to be delivered to the load 120. For an exemplary high power wireless power system (e.g., configured to deliver approximately 11 kW+/−2 kW of power to a load), each capacitive snubber may have a capacitance between 1-30 nanoFarads. In some embodiments, the snubber may have a capacitance between 12-14 nanoFarads, 10-15 nanoFarads, 5-20 nanoFarads, or more. Selecting the value of the capacitive snubbers may improve the matching the wireless power receiver 204 and/or overall system 200, thereby enabling a greater power output, as discussed. In particular, it can be beneficial to ensure proper impedance matching between the receiver resonator coil and the rectifier such that the imaginary (reactive) component of the impedance is cancelled out for certain "corner case" situations (e.g., decoupling between the wireless power transmitter and receiver, the battery voltage being very high or very low, etc.). During the operation of the wireless power system, the input current of the rectifier may have higher-order harmonics. For example, if the system is operating at an operating frequency of approximately 85 kHz (e.g., +/−10 kHz), the input current contains frequencies at higher harmonics of the operating frequency. The higher harmonics can create a small phase shift causing a small imaginary impedance, thereby impacting the overall impedance of seen by the receiver resonator coil. This may cause an imperfect cancelling of the imaginary impedance. By configuring the rectifier 206 with the capacitive snubbers, the snubbers can compensate for that reactive shift of the equivalent impedance active rectifier 206. This can cause the impedance seen by the receiver resonator coil to be compensated properly. Therefore, the receiver resonator coil can see a dominantly resistive load impedance. As mentioned, this configuration can enable a more efficient system to deliver greater power to the load 120. The capacitive snubber value is accordingly selected to compensate the impedance (e.g., the reactive component of the impedance seen by the receiver resonator coil).

The exemplary capacitive snubber may be beneficial in increasing output power, reducing reactive current in the wireless power system 200 (e.g., receiver 204), decreasing switching losses in the transistors S7, S8, and/or improving efficiency of the wireless power receiver 204 and/or wireless power system 200.

In some embodiments, to switch to the battery heating mode, the output of the exemplary rectifier 206 may be coupled to a switch 208 that switches in a resistor for heating the battery. Typically, the battery heater may be a component of a vehicle (e.g., an electric vehicle, a hybrid vehicle, etc.). An exemplary battery heater (e.g., subcircuit 210) may include positive temperature coefficient (PTC) resistor array and a set of relays that configure an equivalent load. The power delivered to the heater may be PWM controlled. Therefore, in the battery heating mode, the exemplary wireless power system may maintain a constant voltage (CV) at its output.

In some embodiments, the wireless power transmitter 202 can be configured such that:

$$X_{GA}=X_{1s}=X_{2s}=X_{3s}$$

where $X_{1s}$ is the combined reactance of components $L_{1s}$, $C_{1sa}$, $C_{1sb}$; $X_{2s}$ is the combined reactance of component(s) $C_{2s}$; and $X_{3s}$ is the combined reactance of components $L_{3sa}$, $L_{3sb}$, $C_{3sa}$, $C_{3sb}$. In exemplary transmitter 202, the maximum current $I_{1s\_max}$ in the transmitter 200 is at maximum bus voltage $V_{bus\_max}$. In some embodiments, the impedance matching of the wireless power transmitter 202 can be configured such that:

$$X_{GA} = \frac{1}{\omega C_{2s}} = \omega L_{3s} - \frac{1}{\omega C_{3s}} = \omega L_{1s} - \frac{1}{\omega C_{1s}} = \frac{2\sqrt{2}}{\pi} \frac{V_{bus}}{I_{1s}}$$

where $X_{GA}$ is the characteristic impedance presented by the components $L_{1s}$, $C_{1s}$, $C_{2s}$, $L_{3s}$, $C_{3s}$ in portion 201 of the transmitter 202.

In some embodiments, the wireless power receiver 204 can be configured such that:

$$X_{VA}=X_{1d}=X_{2d}=X_{3d}$$

where $X_{1d}$ is the combined reactance of components $L_{1d}$, $C_{1da}$, $C_{1db}$; $X_{2d}$ is the combined reactance of component(s) $C_{2d}$; and $X_{3d}$ is the combined reactance of components $L_{3da}$, $L_{3db}$. In some embodiments, the wireless power receiver 204 can be configured such that:

$$X_{VA2}=X_{1d}=X_{2d}$$

$$X_{VA2}=X_{3d}$$

such that the system can deliver greater output power. In some embodiments, the impedance matching of the wireless power receiver 204 can be configured such that:

$$X_{VA} = \frac{1}{\omega C_{2d}} = \omega L_{3d} = \omega L_{1d} - \frac{1}{\omega C_{1d}} = \frac{2\sqrt{2}}{\pi} \frac{V_{batt}}{I_{1d}}$$

where $X_{VA}$ is the reactance presented by the components $L_{1d}$, $C_{1d}$, $C_{2d}$, $L_{3d}$ of portion 203. In exemplary receiver 202, the maximum current $I_{1d\_max}$ in the receiver 200 is at maximum battery voltage $V_{battery\_max}$. An exemplary battery (e.g., an electric or hybrid vehicle battery) may have a voltage range of 320-450 $V_{DC}$.

In some embodiments, during charging mode, the dual-mode wireless power system 200 can deliver full power (e.g., approximately 3.3 kW or less, approximately 6.6 kW or less, approximately 11 kW or less, approximately 21 kW or less, etc.) to the battery for some or all ranges of coupling (e.g., refer to SAE International Standard J2954_201904 for "Wireless Power Transfer for Light-Duty Plug-in/Electric Vehicles and Alignment Methodology") between the resonator coil of the transmitter 202 (e.g., coil L1s) and the resonator coil of the receiver 204 (e.g., coil L1d). In some cases, the power delivery in some ranges of coupling may be less than full power ("derated") (e.g., less than 3.3 kW, less than 6.6 kW, less than 11 kW, less than 21 kW, etc.) due to the challenges of operating between the two modes. For an exemplary system 200 configured to deliver approximately 11 kW, the current in the transmitter resonator coil L1s may be 78 $A_{RMS}$ or less (e.g., at a bus voltage $V_{bus}$ of 840 V) and the receiver resonator coil L1d may be 50 $A_{RMS}$ or less (e.g., at a battery voltage $V_{battery}$ of 450 V). Note that, at derated power, the current in the transmitter resonator coil L1s may be 65 $A_{RMS}$ or less. In some embodiments, the dual-mode wireless power system 200 can deliver power to the battery with at least 88% efficiency (from power source 105 to input of the load (e.g., battery) 120). To attain this level of efficiency, in some embodiments, the transistors S7, S8 of the active rectifier 206 can employ zero-voltage switching (ZVS).

In the exemplary battery 'charging' mode, the active rectifier 206 can operate as a synchronous rectifier, in which the transistors S7, S8 are used to rectify the sinusoidal voltage signal $V_{AC}$. In this mode, the equivalent impedance of the active rectifier 206 may be configured to be resistive, allowing for a simplified control of the receiver 204.

In the exemplary battery 'heating' mode, the active rectifier can operate in a constant voltage (CV) mode, thereby enabling low switching and conduction losses in the receiver 204. In heating mode, the system 200 may be rated to deliver 8 kW of power.

Figure 3:
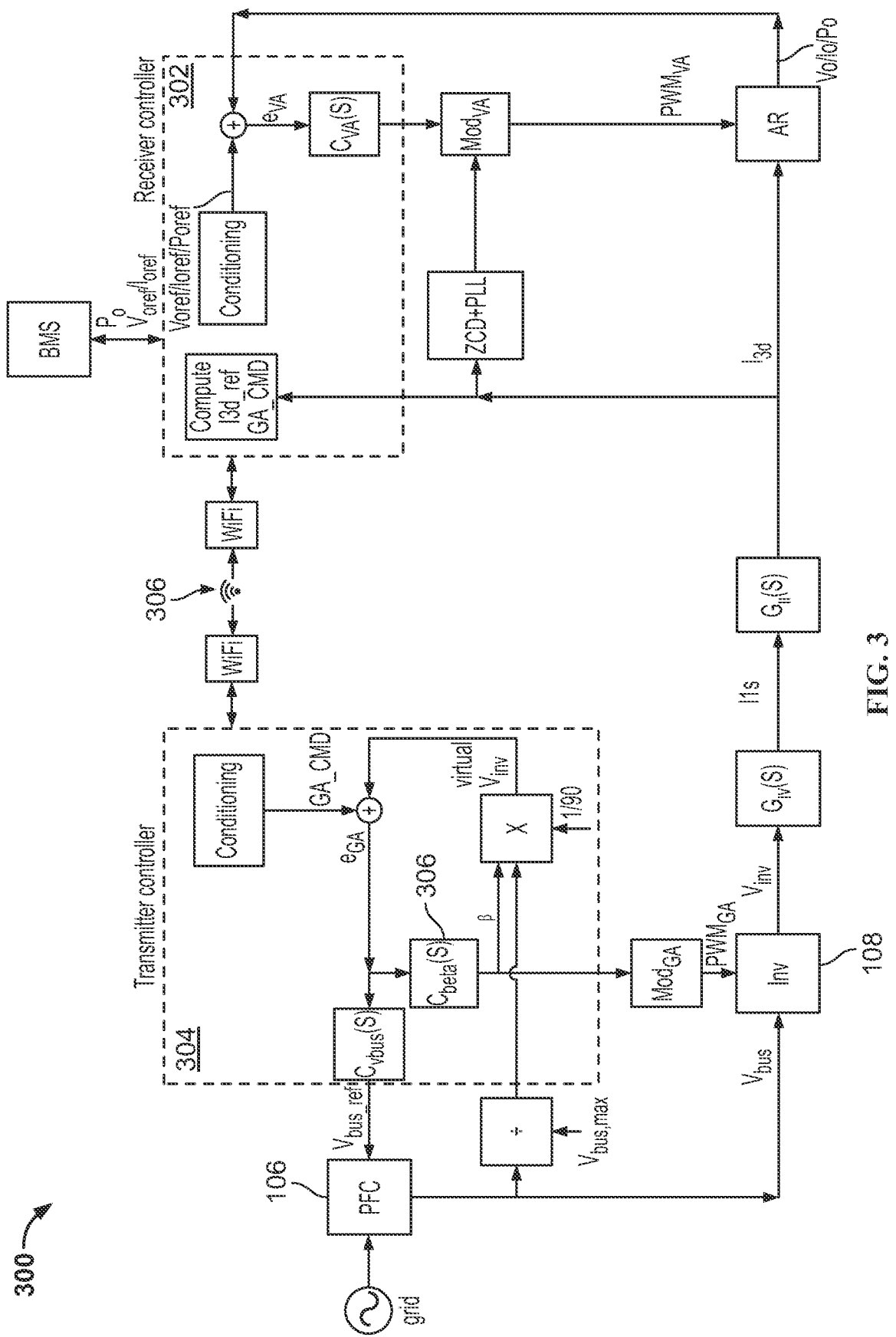
FIG. 3 is a diagram of an exemplary control system for a wireless power system configured to operate in dual modes.
Figure 4A:
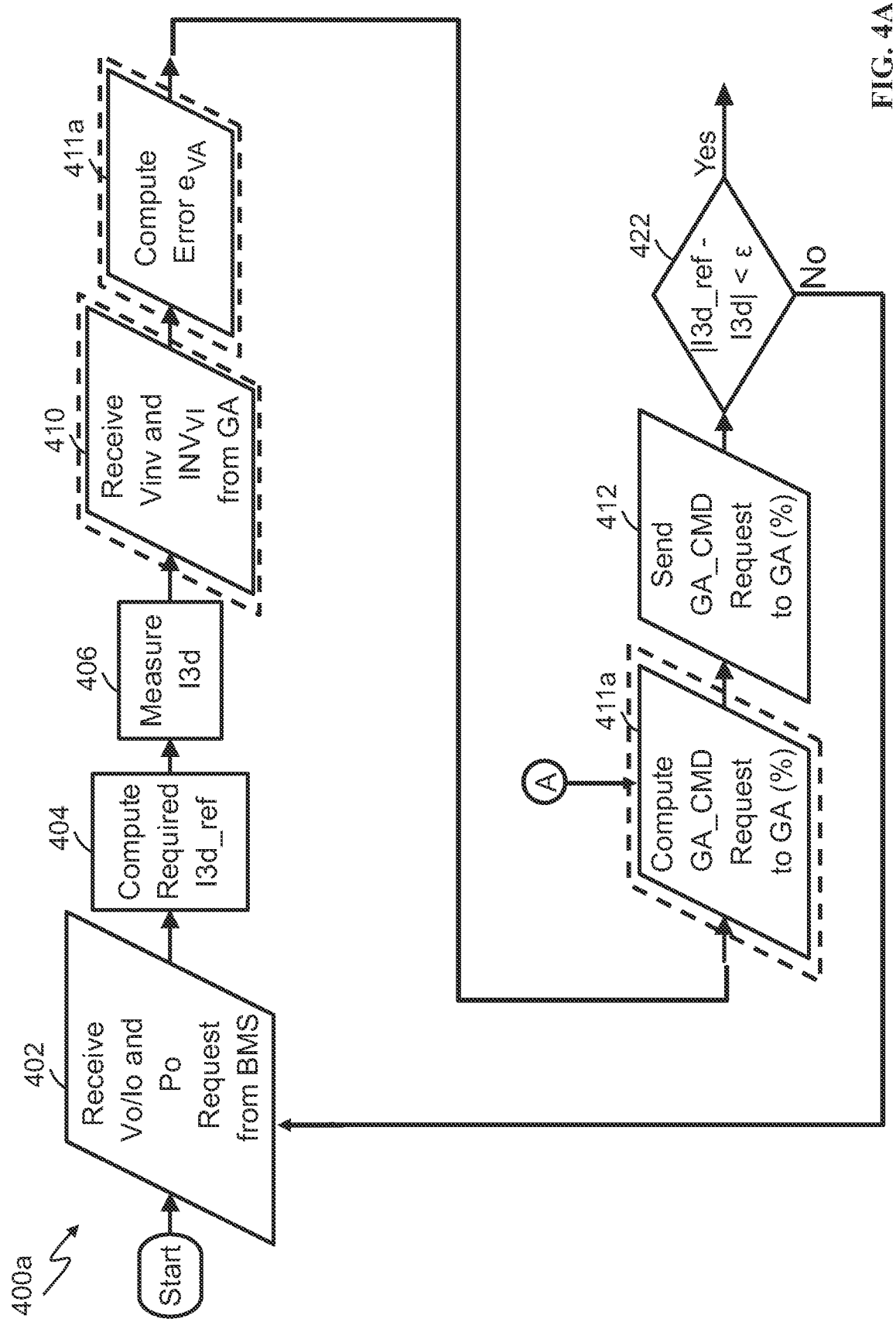
FIGS. 4A-4C are flowcharts of an exemplary method for the exemplary control system of FIG. 3.
Figure 4B:
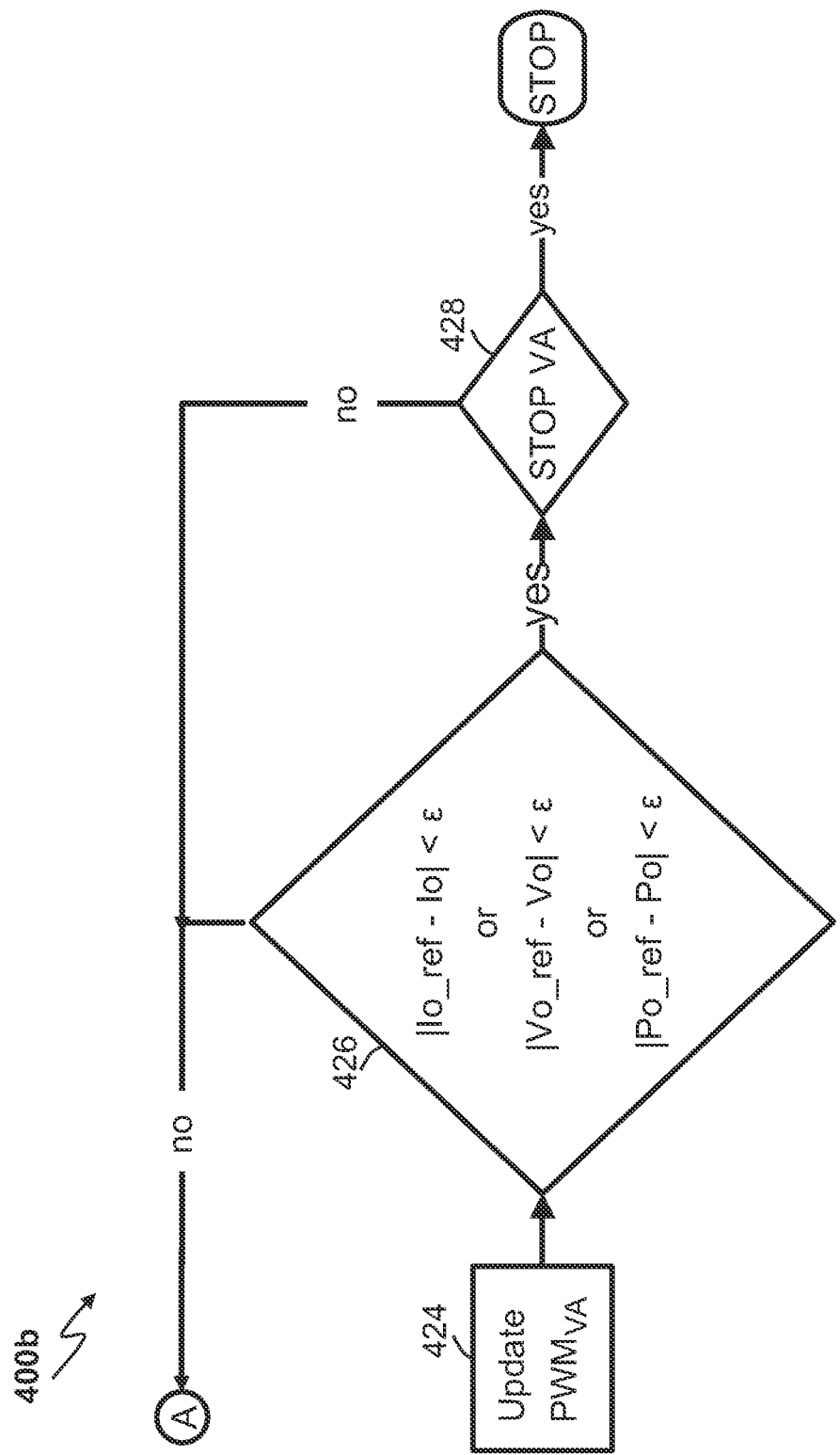
Figure 4C:
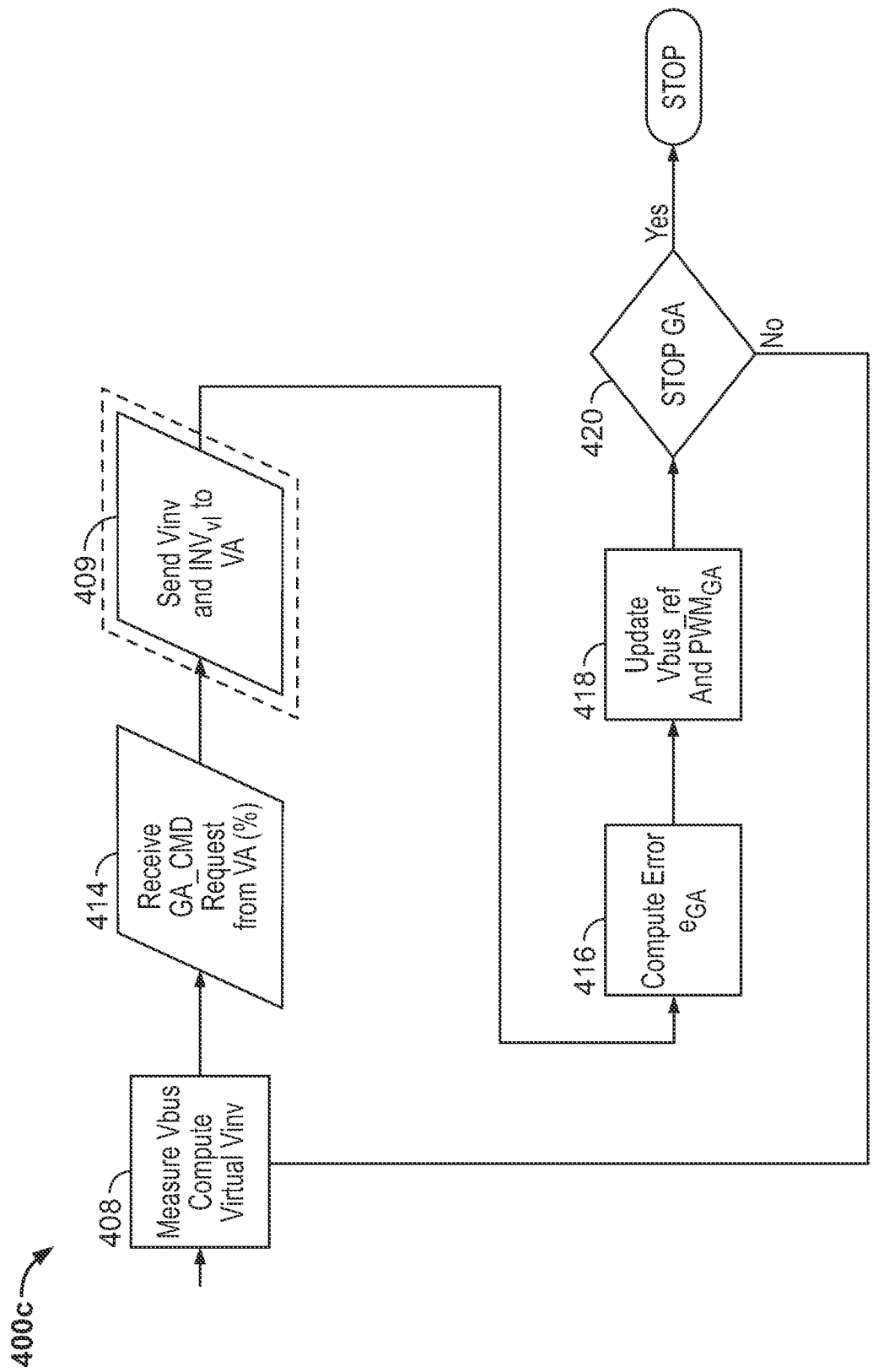

FIG. 3 is a diagram of a control system 300 for an exemplary wireless power system configured to operate in dual modes. FIGS. 4A-4C are flowcharts of an exemplary method 400a, 400b, 400c (collectively referred to as 400) for the exemplary control system 300. Specifically, FIGS. 4A-4B illustrates the control process(es) 400a, 400b in the receiver 204 and FIG. 4C illustrates the control process(es) 400c in transmitter 202. For the sake of clarity and conciseness, FIGS. 3 and 4A-4C are discussed here together. Note that the following processes may be executed in a different order or different times.

Referring to method 400a, in process 402, the receiver controller 302 can receive a request signal from the battery management system (BMS). The request signal may be for the receiver 204 to provide a particular output power $P_O$, output voltage $V_O$ (represented as reference voltage signal $V_{O\_ref}$), and/or output current $I_O$ (represented as reference current signal $I_{O\_ref}$), depending on the mode of operation (e.g., constant current (CC) or constant voltage (CV)). In process 404, the controller 302 may determine (e.g., compute, calculate, etc.) a reference current $I_{3d\_ref}$ for the input current $I_{3d}$ of the rectifier 206. In process 406, the controller 302 may determine (e.g., measure) current $I_{3d}$ (e.g., via coil current sensor).

Referring to method 400c, in optional process 408, the transmitter controller 304 may determine inverter voltage $V_{inv}$ and/or signal $INV_{VI}$ and, in optional process 409, the controller 304 may sent a signal representative of inverter voltage $V_{inv}$ and/or signal $INV_{VI}$ to the receiver controller 302 via wireless communication 306 (e.g., Wi-Fi, radio, Bluetooth, etc.). Note that signal $INV_{VI}$ refers to the inverter output voltage and output current phase-shift and can be used to determine whether the inverter 108 is operating in zero-voltage switching (ZVS) mode. Referring to method 400a, in optional process 410, the controller 302 may receive an inverter voltage $V_{inv}$ and/or signal $INV_{VI}$ from the transmitter 202. In optional process 411a, the error signal $e_{VA}$ is determined (e.g., computed). Note that $e_{VA}$ can be equal to $\varepsilon_{Io}$, $\varepsilon_{Vo}$ or $\varepsilon_{Po}$ (as described in more detail below). In optional process 411b, the request signal GA_CMD is computed based on the determined current $I_{3d}$. In process 412, the receiver 204 may send a request signal GA_CMD to the transmitter 202 based on the determined current $I_{3d}$. The request signal GA_CMD may be sent via wireless communication 306 (e.g., Wi-Fi, radio, Bluetooth, etc.).

Referring to method 400c, in process 414, the transmitter controller 304 may receive the signal GA_CMD from the receiver controller 302. In process 416, the transmitter controller 304 may determine the error signal $e_{GA}$ based on the received signal GA_CMD. Note that the error signal $e_{GA}$ is used to determine a beta β factor (by control module 306) for control signals $PWM_{GA}$ for the transistors of the inverter 108. Beta β factor determines the relative phase-shift between two legs of the inverter 108. Full phase-shift may be achieved with beta β=90, as the phase-shift is 180 degrees (2*β=phase-shift). This β factor can be further used to determine a virtual inverter voltage $V_{inv}$ which can be used to control the transmitter coil current without utilizing costly sensors to measure the coil current directly (e.g., at the output of the inverter 108). Refer also process 502 and FIG. 5. In process 418, the transmitter controller 304 may determine a reference bus voltage signal $V_{bus\_ref}$ and/or control signals $PWM_{GA}$ for the transistors of the inverter 108. The transmitter 202 may then output power according to the voltage signal $V_{bus\_ref}$ (or otherwise stop the transmitter 202 via decision point 420). This may be referred to as the adjusted power.

Referring to method 400a, the receiver controller 302 can determine the input current $I_{3d}$ of the active rectifier 206 as a result of the adjusted power from the transmitter 202. In process 422, the current $I_{3d}$ can be compared to the determined reference current $I_{3d\_ref}$ (see process 404) according to the following function:

$$|I_{3d\_ref} - I_{3d}| < \varepsilon_{I3d}$$

In the above relationship, the difference between the current $I_{3d}$ and reference current $I_{3d\_ref}$ is compared to a predetermined error value $\varepsilon_{I3d}$. If the difference is less than the error, then, in process 424 of method 400b, the modulator $Mod_{VA}$ can update the control signal(s)s $PWM_{VA}$. Note that the exemplary control signal(s) $PWM_{VA}$ for transistors S7, S8 of active rectifier 206 may be generated based on the current $I_{3d}$ (via control module(s) ZCD+PLL and modulator $Mod_{VA}$, as discussed further below). The exemplary control signal(s) $PWM_{VA}$ may be based on the error of the output voltage (e.g., in constant voltage mode) or output current (e.g., in constant current mode). If the difference is greater than or equal to the error, then control passes back to process 402.

Referring still to method 400b, in process 426, if the BMS requested a current (e.g., in the heating mode, charging mode, etc.), then the difference between the output current $I_o$ and reference current signal $I_{o\_ref}$ is compared to an error value as follows:

$$|I_{O\_ref} - I_O| < \varepsilon_{Io}$$

Additionally or alternatively, in process 426, if the BMS requested a voltage (e.g., in the charging mode, heating mode), then the difference between the output current $V_o$ and reference current signal $V_{o\_ref}$ is compared to an error value as follows:

$$|V_{O\_ref} - V_O| < \varepsilon_{Vo}$$

Additionally or alternatively, in process 426, if the BMS requested a power (e.g., in the charging mode), then the difference between the output current $P_o$ and reference current signal $P_{o\_ref}$ is compared to an error value as follows:

$$|P_{O\_ref} - P_O| < \varepsilon_{Po}$$

Depending on the request, if the comparison is greater than the respective error value, then control passes to process 411a. If the comparison is less than the respective error value, then receiver 204 provides the requested current $I_O$ or voltage $V_O$ to the BMS accordingly (or otherwise stop the receiver 204 via decision point 428). The control system 300 can be beneficial for operating under cost restraints in that relatively complex control processes are executed with simple system control facilities. Further, costs can be reduced due to the elimination of sensors for measuring current (e.g., coil current sensors) and/or voltage at one or more points in the wireless power system.

Figure 5:
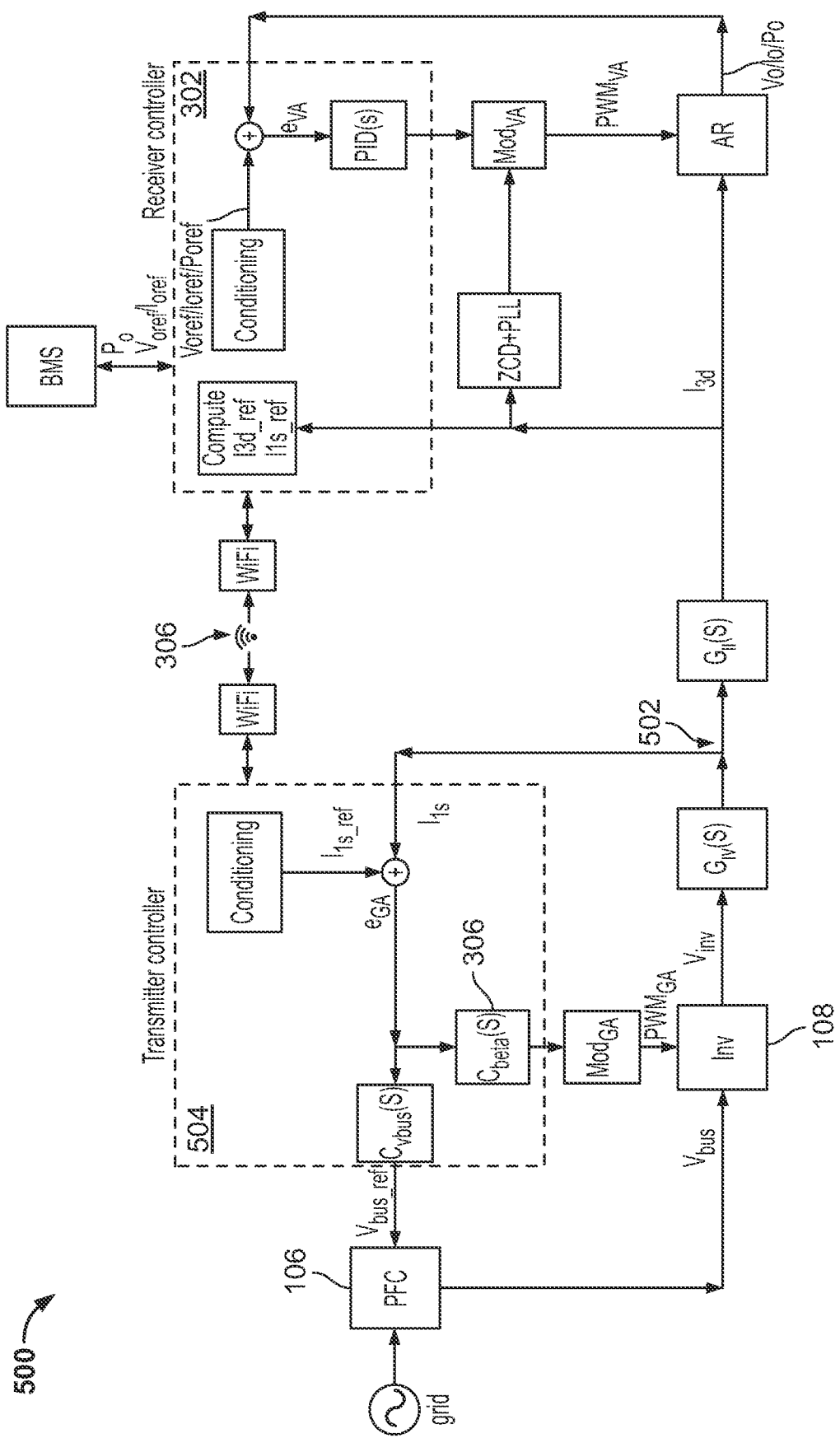
FIG. 5 is a diagram of an exemplary control system for a wireless power system configured to operate in dual modes, including current measurement.

FIG. 5 is a diagram of a control system 500 for an exemplary wireless power system configured to operate in dual modes, including current measurement at the transmitter resonator coil (represented by output 502 of transfer function $G_{IV}(s)$). $G_{IV}(s)$ is a transfer function from inverter's output voltage $V_{inv}$ to transmitter coil current $I_{1s}$. $G_{II}(s)$ is a transfer function from transmitter coil current $I_{1s}$ to the active rectifier input current $I_{3d}$. Note that control system 500 has many components in common with control system 300. In the exemplary control system 500, error signal $e_{GA}$ is based on a current measurement of coil current $I_{1s}$.

Active Rectification Methods

Figure 6:
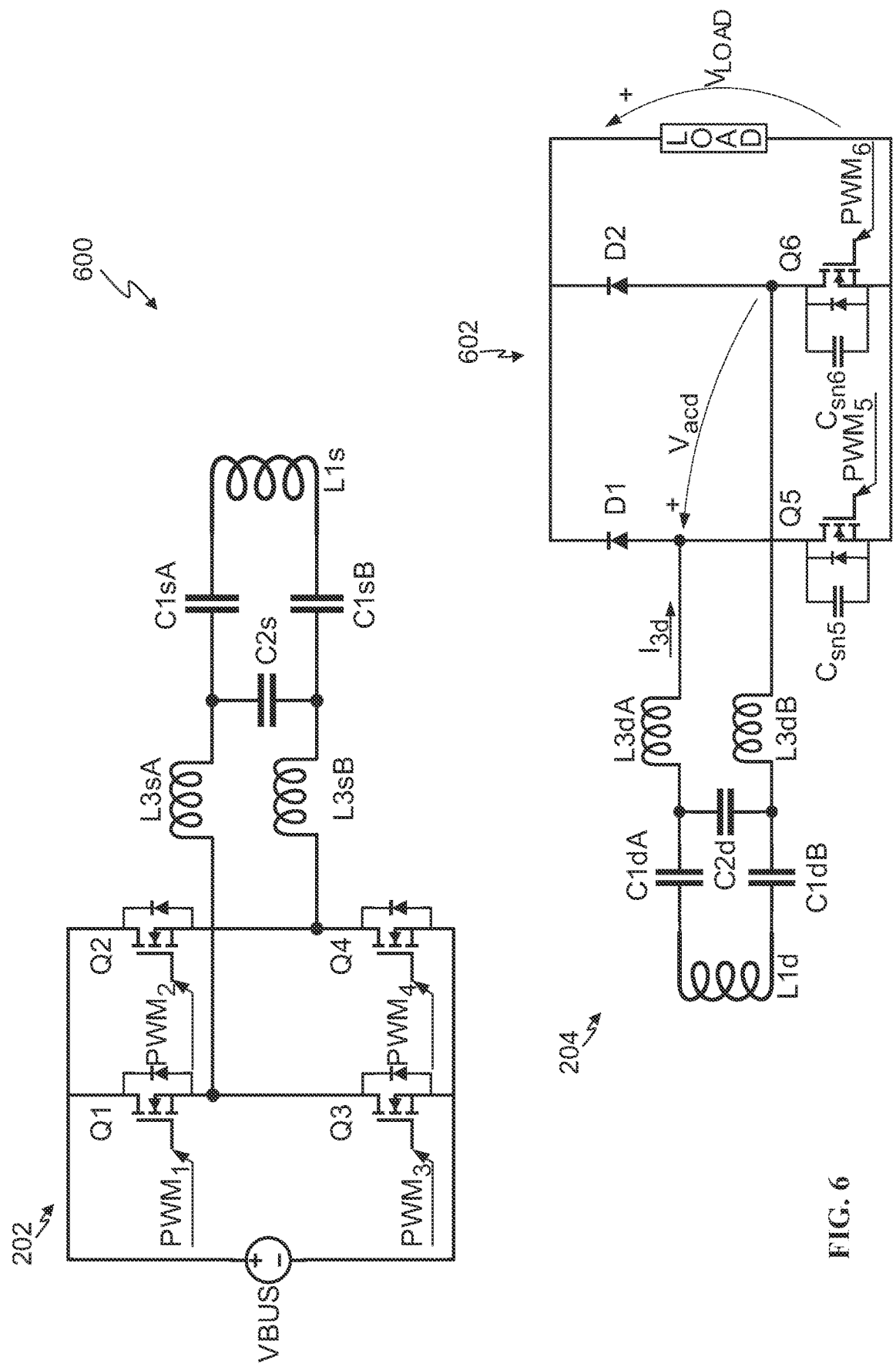
FIG. 6 is a schematic of an exemplary wireless power system, including an active rectifier.
Figure 7A:
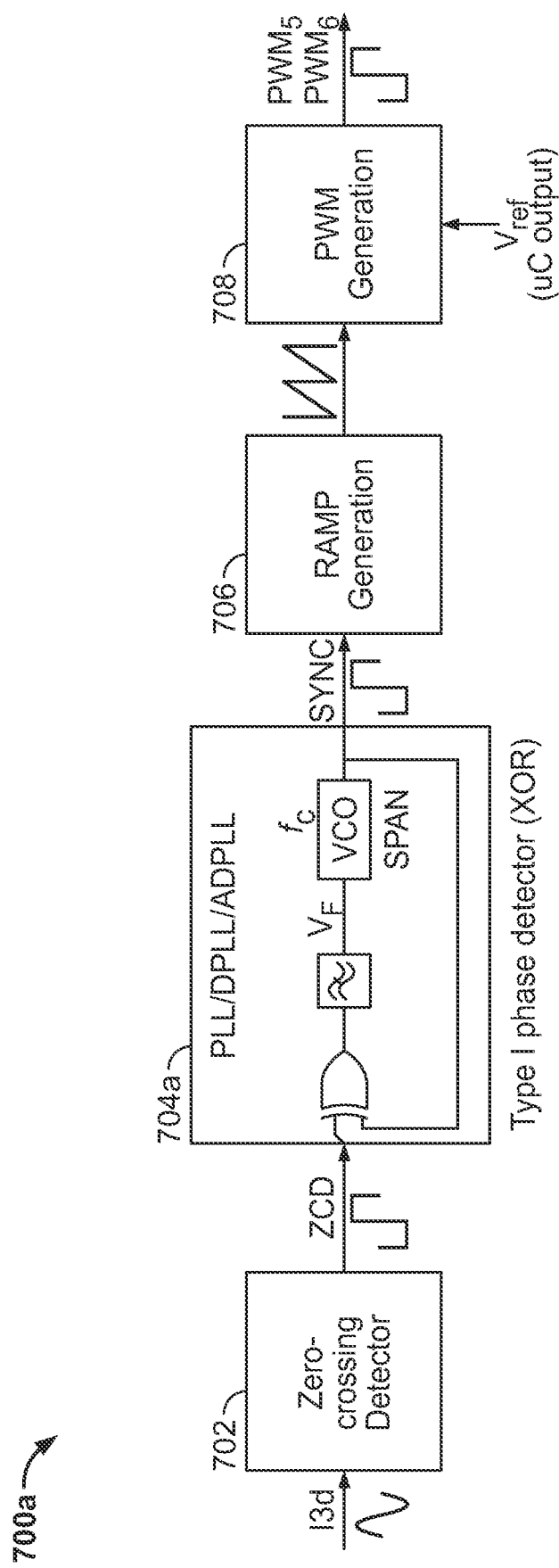
FIG. 7A is a block diagram for generating control signals for the transistor(s) of the exemplary active rectifier of FIG. 2B or FIG. 6.
Figure 7B:
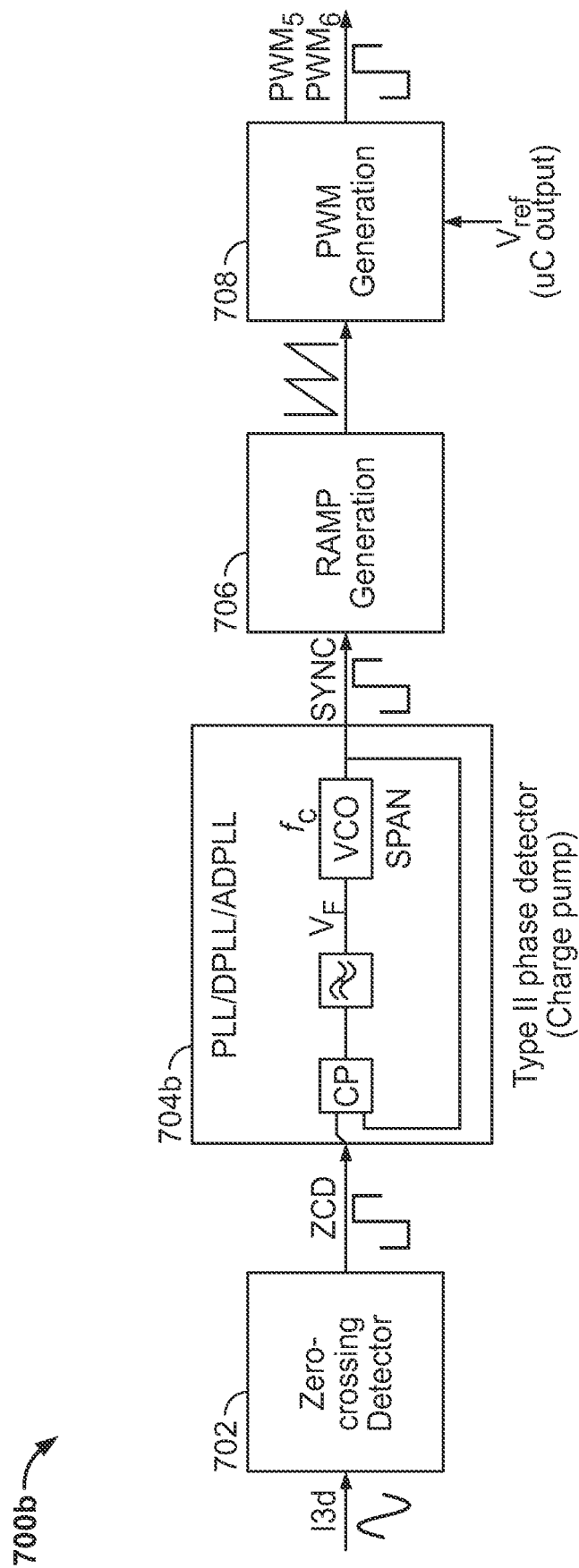
FIG. 7B is a block diagram of an example workflow for generating control signals for the transistor(s) of the exemplary active rectifier of FIG. 2B or FIG. 6.

FIG. 6 illustrates an exemplary wireless power system, including the exemplary active rectifier 602. Note that, in some embodiments, the transmitter 202 can include a capacitive element in series with inductor L3sA and/or inductor L3sB. The receiver 204 can include a capacitive element in series with inductor L3dA and/or inductor L3dB. FIG. 7A are a block diagrams 700a, 700b for generating control signals for the transistor(s) of the exemplary active rectifier 206 or 602. As discussed above for FIGS. 3 and 4A-4B, the input current $I_{3d}$ can be provided to a zero-crossing detector 702, which outputs signal ZCD representing the zero crossings of the sinusoidal current signal $I_{3d}$. Signal ZCD can be provided to phase-locked loop (PLL) module 704 (e.g., a digital PLL (DPLL), all digital PLL (ADPLL), etc.) to determine the phase of the current signal $I_{3d}$ based on signal ZCD. Diagrams 700a and 700b provide alternative implementations of module 704. Module 704a may be a Type I phase detector featuring XOR logic gate. Module 704b may be a Type II phase detector featuring a charge pump. Signal SYNC representing extracted phase information can be provided to a ramp generation module 706. The generated ramp signal and reference voltage signal $V_{ref}$ is provided to PWM generator 708. The PWM generator 708 is configured to produce control signals PWM5 and PWM6 (e.g., $PWM_{VA}$) for transistors Q5 and Q6, respectively (e.g., transistors S7 and S8, respectively). The exemplary PWM generator 708 and optionally the ramp generator 706 may be referred to as the modulator (e.g., $Mod_{VA}$). In some embodiments, the modulator can be configured to ensure stability of operation of the active rectifier in the presence of large current harmonics in input current $I_{3d}$. The exemplary modulator may be beneficial in maintaining zero-voltage switching (ZVS). The exemplary modulator may enable the constant voltage (CV) operation as described above.

Figure 8:
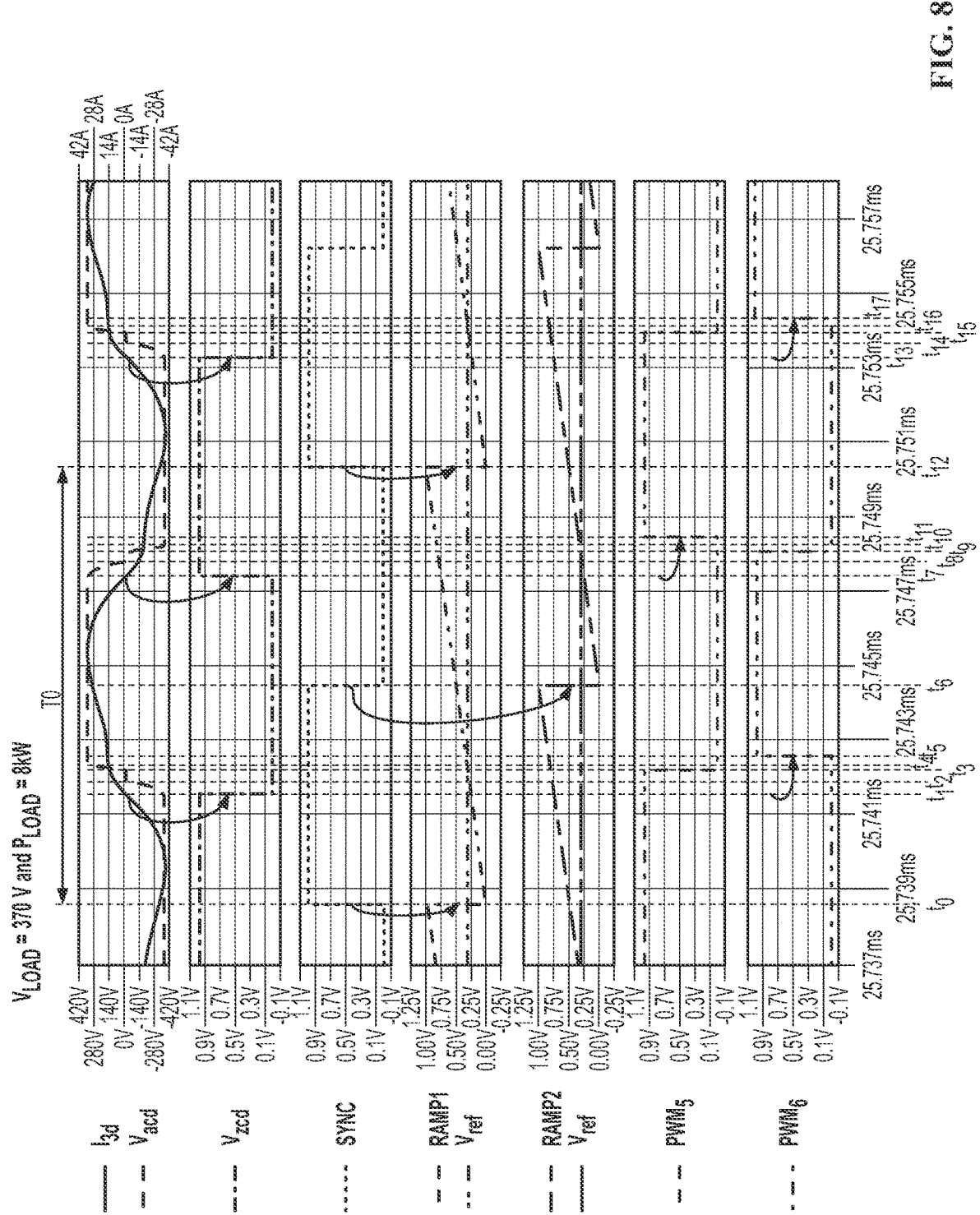
FIG. 8 is a set of plots of various signals in the wireless power system of FIGS. 2A-2B or FIG. 6, including the exemplary active rectifier of FIG. 2B or FIG. 6, as a function of time.
Figure 9C:
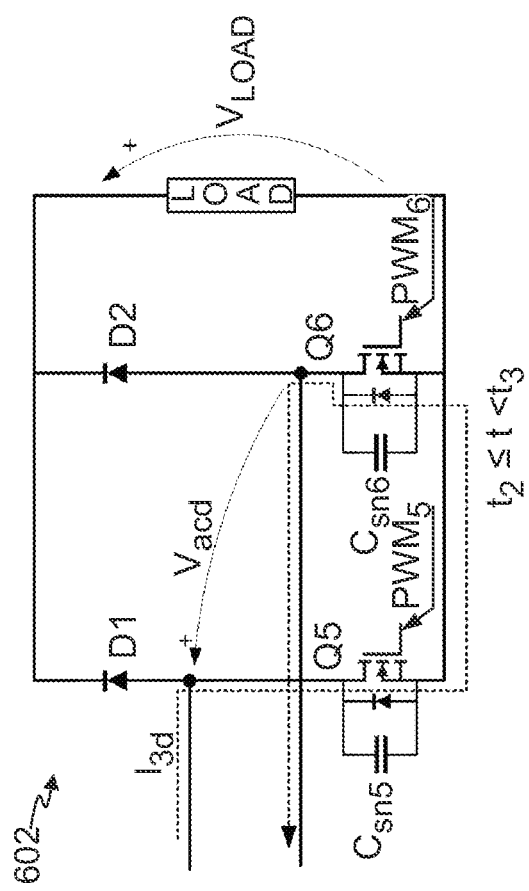
Figure 9D:
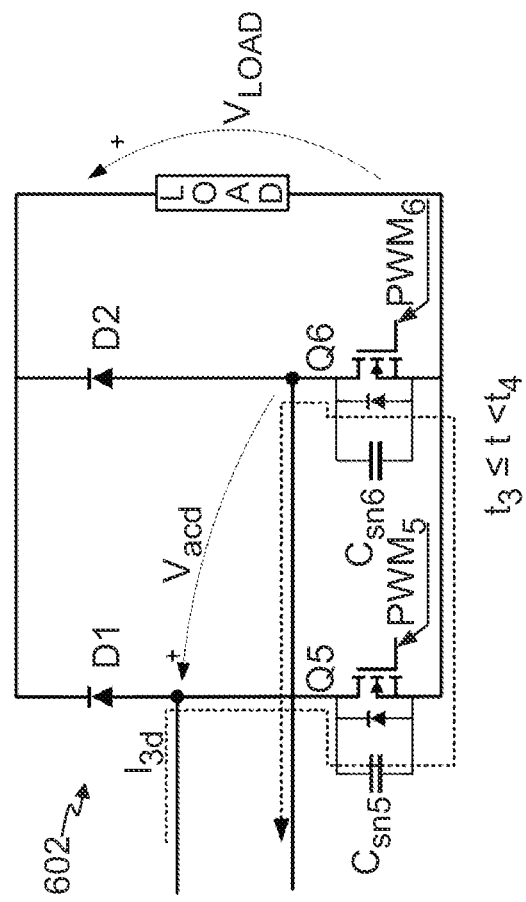
Figure 9E:
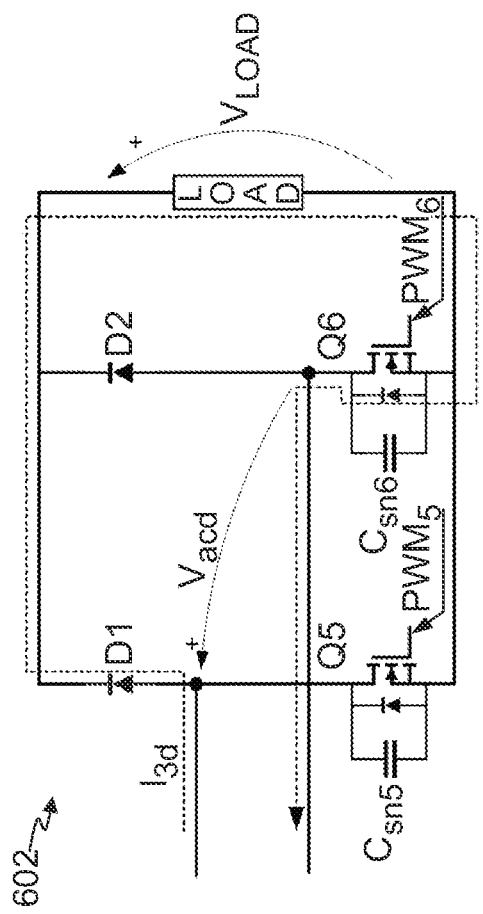
Figure 9F:
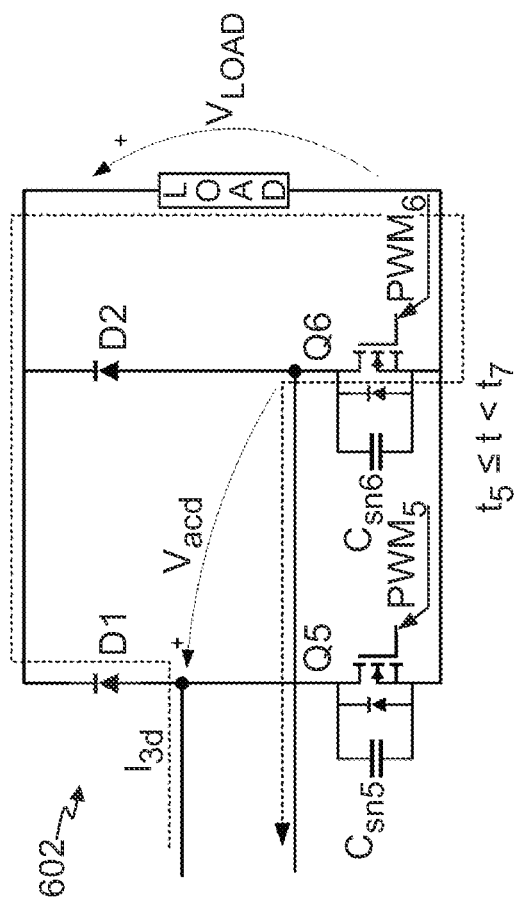
Figure 9G:
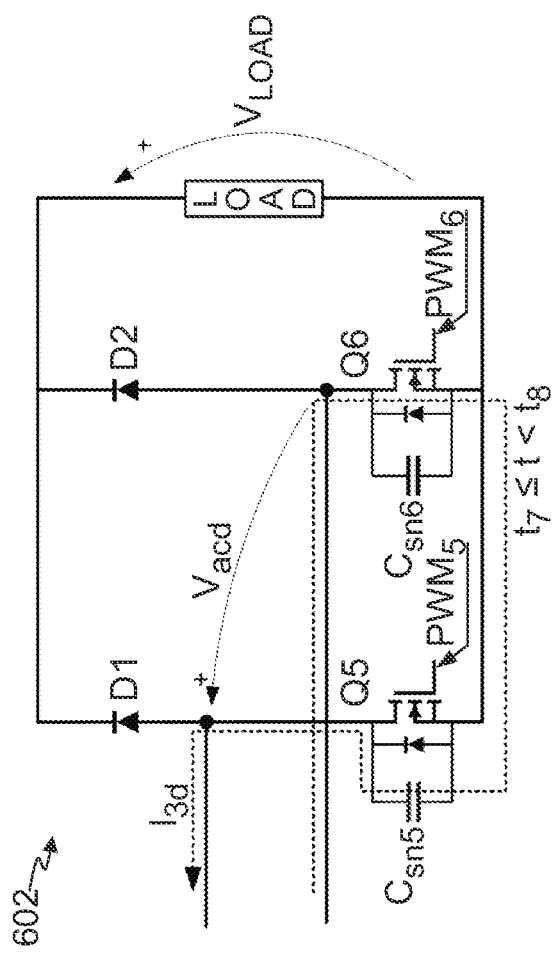
Figure 9H:
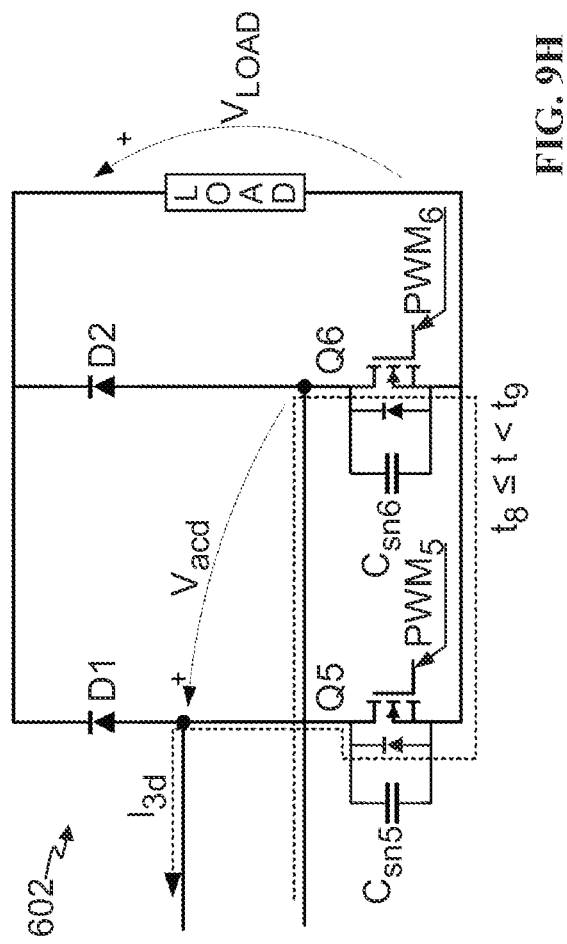
Figure 9I:
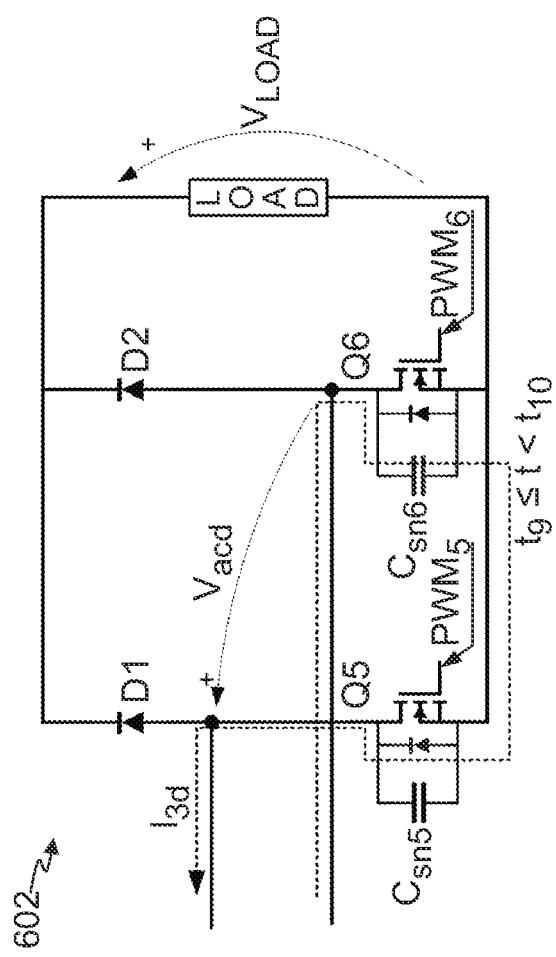
Figure 9J:
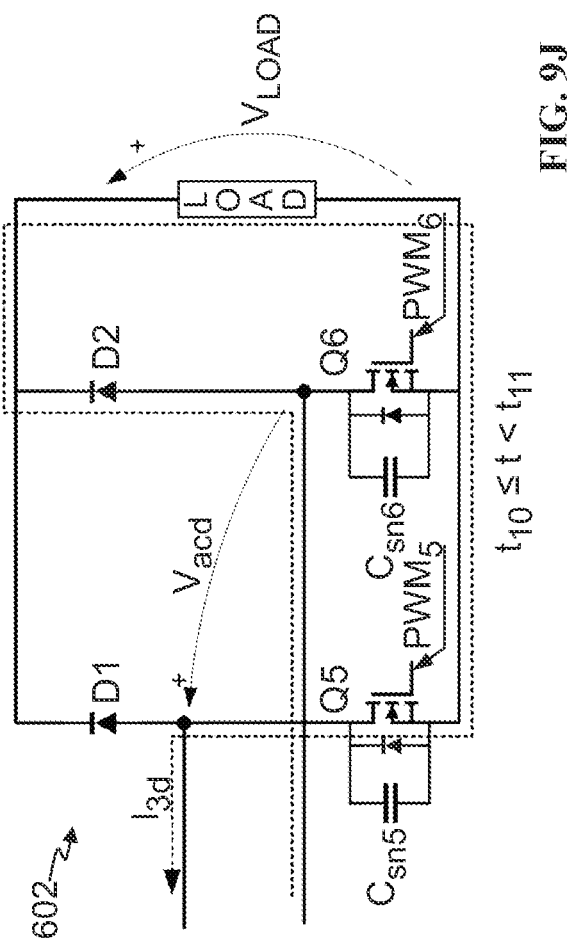
Figure 9K:
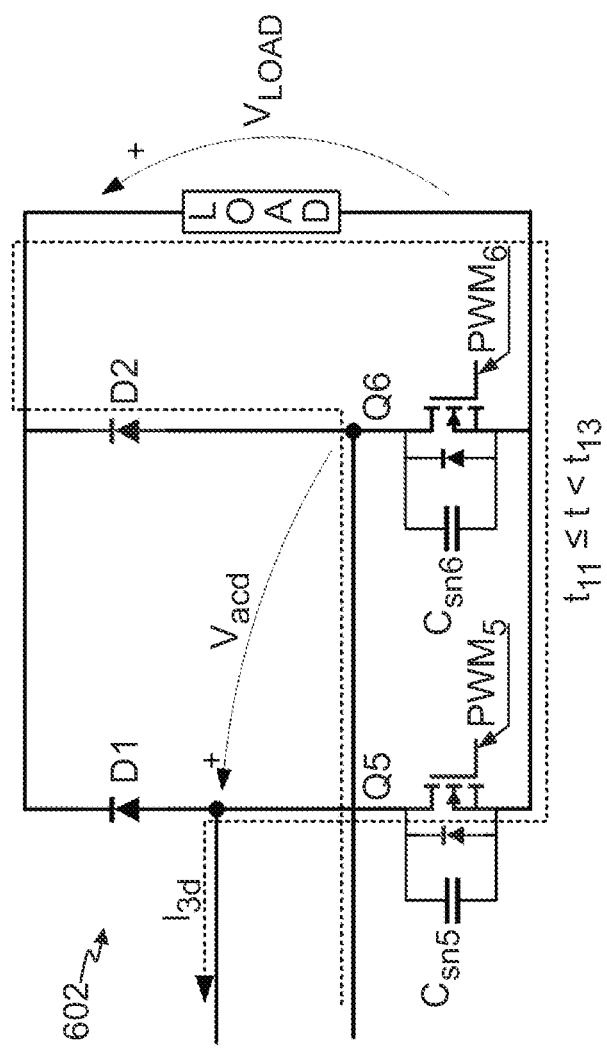

FIG. 8 is a set of plots of various signals in the wireless power system 600, including the exemplary active rectifier 602, as a function of time. FIGS. 9A-9K illustrate the current (in dashed lines) and/or voltage in the exemplary active rectifier as a function of time. For the following discussion, note that T0 is a switching period and the phase shift between signal ZCD and signal SYNC signals can be determined according to the following:

$$t_1 - t_0 = 0.5 \cdot V_F \cdot T0$$

where $V_F$ is normalized voltage of the PLL's low-pass filter and in the range [0, 1]. Referring to FIGS. 8 and 9A-9K, in various embodiments, the rectifier 206 or 602 can be configured according to the following method.

At time $t_0$: Start of a new cycle. PLL is locked and system 200, 600 is operating at steady-state. Ramp for MOSFET Q5 control is reset to zero:

$$RAMP1(t=t_0)=0$$

MOSFET Q5 and diode D2 are ON; and
Diode D1 and MOSFET Q6 are OFF.

At time $t_1$: Zero-crossing detection of $I_{3d}$ occurs. Output of zero-crossing detector ZCD changes its state.

$$RAMP1(t=t_1)=0.25-V_F/2$$

$V_{acd}$ voltage reduces to zero (0) as snubber capacitor $C_{sn6}$ discharges.
MOSFET Q5 is ON; and
Diode D1, diode D2, and MOSFET Q6 are OFF.

At time $t_2$: After snubber capacitor $C_{sn6}$ is discharged, body-diode of MOSFET Q6 turns on.
MOSFET Q5 and body-diode of MOSFET Q6 are ON; and
Diode D1 and diode D2 are OFF.

At time $t_3$: PWM5 turn-off sequence produced by controller (e.g., controller 302) duty control variable $V_{ref}$. MOSFET's effective duty-cycle ($D_{eff}$) is linked to $V_{ref}$ as:

$$V_{ref}=0.25+D_{eff}/2$$

where the effective duty does not include "synchronous rectification" operation of the MOSFET (current through MOSFET is negative and MOSFET is ON). Voltage $V_{acd}$ starts its transitions to $V_{LOAD}$ as snubber capacitor $C_{sn5}$ charges.

Body-diode of MOSFET Q6 is ON; and
MOSFET Q5, diode D1, and diode D2 are OFF.

At time $t_4$: Diode D1 is turned on as the snubber capacitor $C_{sn5}$ is charged to the voltage $V_{LOAD}$.
Diode D1 and body-diode of MOSFETQ6 are ON; and
MOSFET Q5 and diode D2 are OFF.

At time $t_5$: PWM6 turn-on sequence. The sequence is produced from time $t_1$ and turn-on delay $T_{del}=t_5-t_1$, which is determined empirically (goal is to maintain ZVS on MOSFETs during transients).
Diode D1 and MOSFET Q6 are ON; and
MOSFET Q5 and diode D2 are OFF.

At time $t_6$: $t_6-t_0=T0/2$. Ramp for MOSFET Q6 control is reset to zero:

$$RAMP2(t=t_4)=0$$

At time $t_7$: Zero-crossing detection of $I_{3d}$ occurs. Output of the zero-crossing detector changes its state.

$$RAMP2(t=t_5)=0.25-V_F/2$$

Voltage $V_{acd}$ reduces to zero, as snubber capacitor $C_{sn5}$ discharges.
MOSFET Q6 is ON; and
Diode D1, diode D2, and MOSFET Q6 are OFF.

At time $t_8$: After snubber capacitor $C_{sn5}$ is discharged, body-diode of MOSFET Q5 turns on.
MOSFET Q6 and body-diode of MOSFET Q5 are ON; and
Diode D1 and diode D2 are OFF.

At time $t_9$: PWM6 turn-off sequence, produced by controller (e.g., controller 302) duty control variable $V_{ref}$. Voltage $V_{acd}$ starts its transitions to $-V_{LOAD}$ as snubber capacitor $C_{sn6}$ charges.
Body-diode of MOSFET Q5 is ON; and
MOSFET Q6, diode D1, and diode D2 are OFF.

At time $t_{10}$: Diode D2 is turned on as the snubber capacitor $C_{sn6}$ is charged to the voltage $V_{LOAD}$.
Diode D2 and body-diode of Q5 are ON; and
MOSFET Q6 and diode D1 are OFF.

At time $t_{11}$: PWM5 turn-on sequence. The sequence is produced from $t_6$ and turn-on delay $T_{del}=t_9-t_6$.
At time $t_{12}$: Same as time $t_0$.
At time $t_{13}$: Same as time $t_1$.
At time $t_{14}$: Same as time $t_2$.
At time $t_{15}$: Same as time $t_3$.
At time $t_{16}$: Same as time $t_4$.
At time $t_{17}$: Same as time $t_4$.

Figure 10:
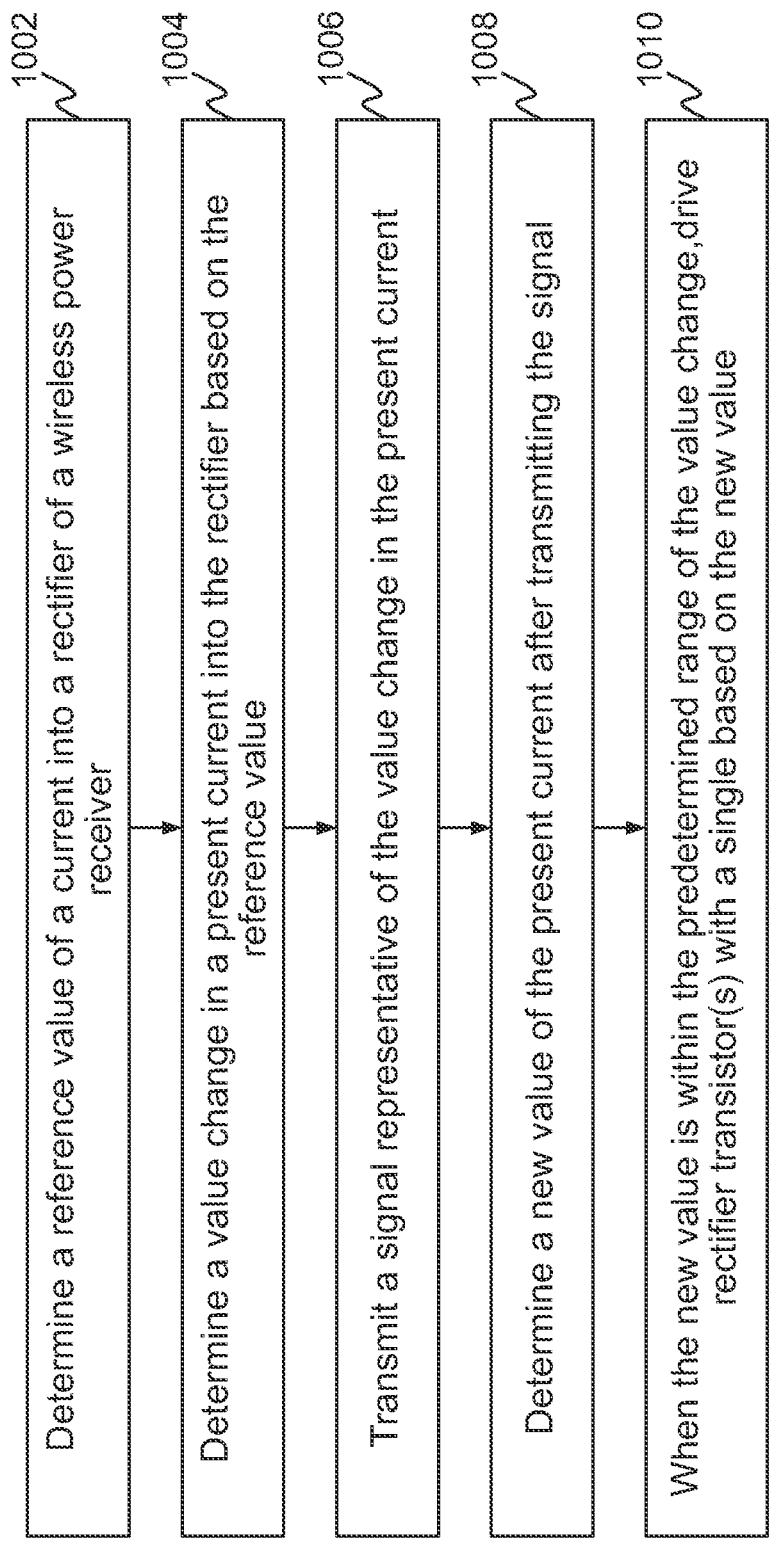
FIG. 10 is a flowchart of an exemplary method for active rectification in a wireless power system of FIGS. 2A-2B or FIG. 6.

FIG. 10 is a flowchart of an exemplary method for active rectification in a wireless power system (e.g., system 200 or 600). In step 1002, the method includes determining a reference value of a current into a rectifier of a wireless power receiver, in which the reference value is based on a load requirement. In step 1004, the method includes determining a value change in a present current into the rectifier based on the reference value. In step 1006, the method includes transmitting, to the wireless power transmitter, a signal (e.g., GA_CMD) representative of the value change in the present current. In step 1008, the method determining a new value of the present current after transmitting the signal. In step 1010, if the new value is within the predetermined range of the value change, driving at least one transistor in the rectifier with a PWM signal based on the new value.

Hardware and Software Implementations

In some examples, some or all of the processing described above can be carried out on one or more centralized computing devices. In some examples, some types of processing occur on one device and other types of processing occur on another device. In some examples, some or all of the data described above can be stored in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 11:
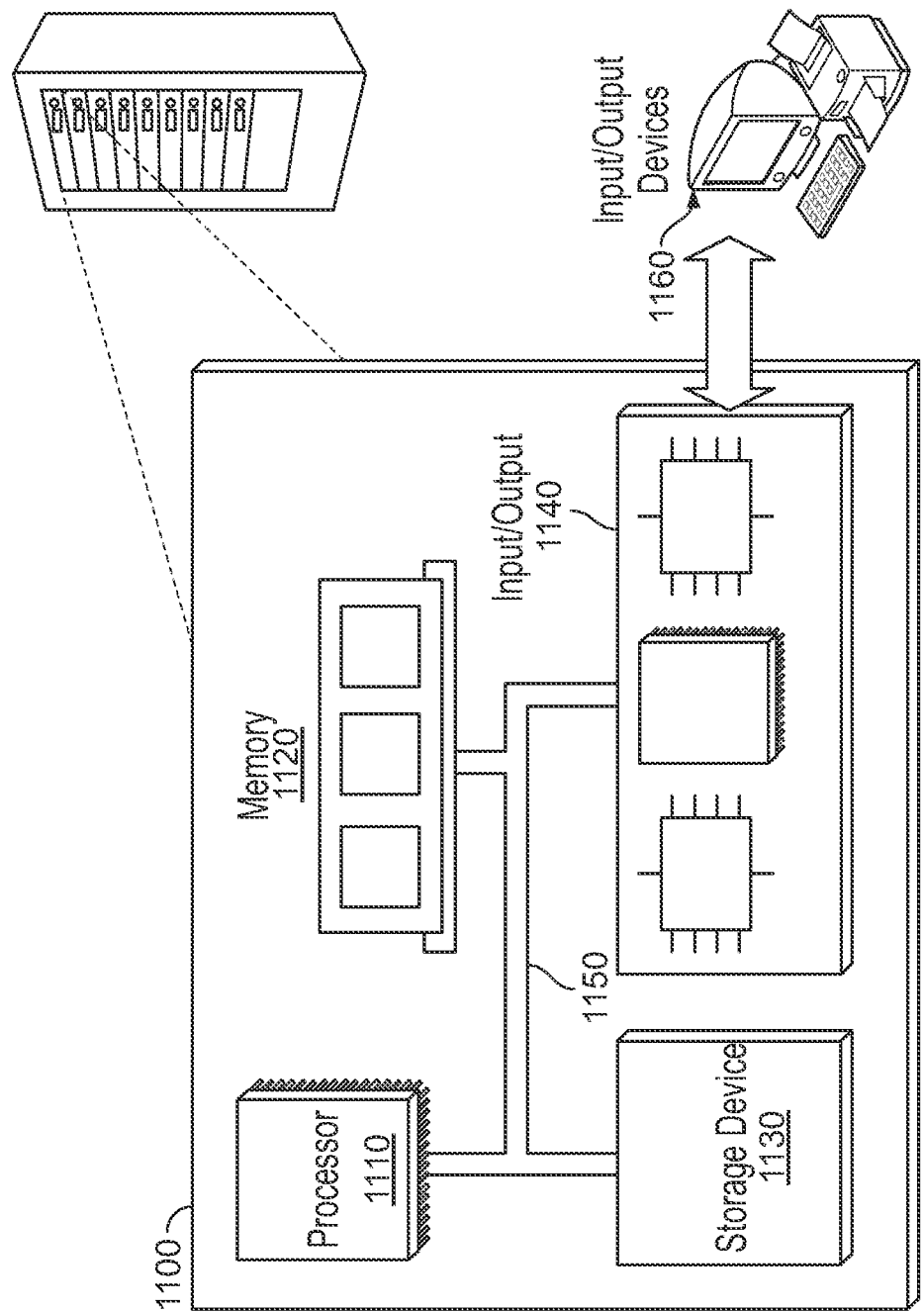
FIG. 11 is a block diagram of an example computer system that may be used in implementing the exemplary systems and methods described herein.

FIG. 11 is a block diagram of an example computer system 1100 that may be used in implementing the technology described in this document. General-purpose computers, network appliances, mobile devices, or other electronic systems may also include at least portions of the system 1100. The system 1100 includes a processor 1110, a memory 1120, a storage device 1130, and an input/output device 1140. Each of the components 1110, 1120, 1130, and 1140 may be interconnected, for example, using a system bus 1150. The processor 1110 is capable of processing instructions for execution within the system 1100. In some implementations, the processor 1110 is a single-threaded processor. In some implementations, the processor 1110 is a multi-threaded processor. The processor 1110 is capable of processing instructions stored in the memory 1120 or on the storage device 1130.

The memory 1120 stores information within the system 1100. In some implementations, the memory 1120 is a non-transitory computer-readable medium. In some implementations, the memory 1120 is a volatile memory unit. In some implementations, the memory 1120 is a nonvolatile memory unit.

The storage device 1130 is capable of providing mass storage for the system 1100. In some implementations, the storage device 1130 is a non-transitory computer-readable medium. In various different implementations, the storage device 1130 may include, for example, a hard disk device, an optical disk device, a solid-date drive, a flash drive, or some other large capacity storage device. For example, the storage device may store long-term data (e.g., database data, file system data, etc.). The input/output device 1140 provides input/output operations for the system 1100. In some implementations, the input/output device 1140 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 1160. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 1130 may be implemented in a distributed way over a network, such as a server farm or a set of widely distributed servers, or may be implemented in a single computing device.

Although an example processing system has been described in FIG. 11, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A method for controlling an active rectifier of a wireless power receiver that comprises a first transistor, a second transistor, a first snubber capacitor coupled in parallel to the first transistor, and a second snubber capacitor coupled in parallel to the second transistor, the method comprising:
   determining a reference value of a current into the rectifier, the reference value being based on a load requirement;
   determining a required value change in a present input current into the rectifier based on the reference value;
   transmitting, to a wireless power transmitter, a signal representative of the required value change in the present input current;
   determining a new value of the present input current after transmitting the signal; and
   when the new value is within a predetermined range of the required value change:
   detecting phase information associated with the new value of the present input current, wherein detecting the phase information associated with the new value comprises:
      detecting zero crossing information associated with the new value of the present input current; and
      providing the zero crossing information to a phase-locked loop module, the module comprising a XOR logic gate or a charge pump;
   generating a PWM signal based on the detected phase information; and
   driving at least one of the first transistor or second transistor with the generated PWM signal, wherein the method further comprises:
      setting a ramp signal associated with the second transistor to zero;
      after detecting a first zero crossing information, discharging the first snubber capacitor thereby reducing an input voltage of the active rectifier to zero and turning on a body diode of the first transistor;
      turning off the second transistor, thereby charging the second snubber capacitor to a load voltage of the wireless power receiver;
      turning on the first transistor;
      setting a ramp signal associated with the first transistor to zero;
      after detecting a second zero crossing information, discharging the second snubber capacitor thereby reducing the input voltage of the active rectifier to zero and turning on a body diode of the second transistor;
      turning off the first transistor, thereby charging the first snubber capacitor to the load voltage; and
      turning on the second transistor.

2. The method of claim 1 further comprising:
receiving, from a battery management system, a request for at least one of: a voltage, a current, or a power from the wireless power receiver.

3. The method of claim 1 further comprising:
when the new value is not within the predetermined range, determining another reference value of the current into the rectifier.

4. The method of claim 1 wherein the transmitting, to the wireless power transmitter, the signal representative of the required value change in the present input current causes a change in power transmitted by the wireless power transmitter to the wireless power receiver.

5. The method of claim 4 wherein the new value of the present input current is based on the change in transmitted power.

6. The method of claim 4 wherein the change in transmitted power is to decrease the power.

7. The method of claim 6 wherein the change in transmitted power is to decrease the power to zero.

8. The method of claim 4 wherein the change in transmitted power is to increase the power.

9. The method of claim 1 further comprising:
comparing the new value of the present input current to the predetermined range of the required value change.

10. The method of claim 1 wherein the method is executed by a controller coupled to the active rectifier.

11. The method of claim 1 wherein the active rectifier further comprises a first diode and a second diode,
wherein the first diode is coupled between a first output node of the rectifier and a first input node of rectifier, the second diode is coupled between a second input node of the rectifier and the first input node, the first transistor is coupled between the first input and a second output node of the rectifier, and the second transistor is coupled between the second input node and the second output node, and wherein the second diode turns on as the second snubber capacitor is charged to the load voltage and the first diode turns on as the first snubber capacitor is charged to the load voltage.

12. The method of claim 1 further comprising:
generating a ramp signal based on the detected phase information; and
providing the ramp signal to a PWM generator for generating the PWM signal.

13. The method of claim 1 wherein generating the PWM signal is further based on a reference voltage signal, the reference voltage signal based on duty cycle of a transistor of the active rectifier.

14. A controller for controlling an active rectifier of a wireless power receiver that comprises a first transistor, a second transistor, a first snubber capacitor coupled in parallel to the first transistor, and a second snubber capacitor coupled in parallel to the second transistor, wherein the controller is coupled to the rectifier and is configured to perform the steps comprising:
determining a reference value of a current into the rectifier, the reference value being based on a load requirement;
determining a required value change in a present input current into the rectifier based on the reference value;
transmitting, to a wireless power transmitter, a signal representative of the required value change in the present input current;
determining a new value of the present input current after transmitting the signal; and
when the new value is within a predetermined range of the required value change:
detecting phase information associated with the new value of the present input current, wherein detecting the phase information associated with the new value comprises:
  detecting zero crossing information associated with the new value of the present input current; and
  providing the zero crossing information to a phase-locked loop module, the module comprising (i) a XOR logic gate or (ii) a charge pump;
generating a PWM signal based on the detected phase information; and
driving at least one of the first and second transistors with the generated PWM signal, wherein the method further comprises:
setting a ramp signal associated with the second transistor to zero;
after detecting a first zero crossing information, discharging the first snubber capacitor thereby reducing an input voltage of the active rectifier to zero and turning on a body diode of the first transistor;
turning off the second transistor, thereby charging the second snubber capacitor to a load voltage of the wireless power receiver;
turning on the first transistor;
setting a ramp signal associated with the first transistor to zero;
after detecting a second zero crossing information, discharging the second snubber capacitor thereby reducing the input voltage of the active rectifier to zero and turning on a body diode of the second transistor;
turning off the first transistor, thereby charging the first snubber capacitor to the load voltage; and
turning on the second transistor.

15. The controller of claim 14 wherein the steps further comprise:
receiving, from a battery management system coupled to the output of the rectifier, a request for at least one of: a voltage, a current, or a power from the wireless power receiver.

16. The controller of claim 14 wherein the steps further comprise:
when the new value is not within the predetermined range, determining another reference value of the current into the rectifier.

17. The controller of claim 14 wherein the transmitting, to the wireless power transmitter, the signal representative of the required value change in the present input current causes a change in power transmitted by the wireless power transmitter to the wireless power receiver.

18. The controller of claim 17 wherein the new value of the present input current is based on the change in transmitted power.

19. The controller of claim 17 wherein the change in transmitted power is to decrease the power.

20. The controller of claim 19 wherein the change in transmitted power is to decrease the power to zero.

21. The controller of claim 17 wherein the change in transmitted power is to increase the power.

22. The controller of claim 14 wherein the steps further comprise:
comparing the new value of the present input current to the predetermined range of the required value change.

23. The controller of claim 14 wherein the controller is coupled to the at least one transistor in the rectifier.

24. The controller of claim 14 wherein the active rectifier further comprises a first diode and a second diode,
wherein the first diode is coupled between a first output node of the rectifier and a first input node of rectifier, the second diode is coupled between a second input node of the rectifier and the first input node, the first transistor is coupled between the first input and a second output node of the rectifier, and the second transistor is coupled between the second input node and the second output node, and
wherein the second diode turns on as the second snubber capacitor is charged to the load voltage and the first diode turns on as the first snubber capacitor is charged to the load voltage.

25. The controller of claim 14 further comprising:
generating a ramp signal based on the detected phase information; and
providing the ramp signal to a PWM generator for generating the PWM signal.

26. The controller of claim 14 wherein generating the PWM signal is further based on a reference voltage signal, the reference voltage signal based on duty cycle of a transistor of the active rectifier.

* * * * *